US007101017B2

(12) United States Patent
Endo et al.

(10) Patent No.: US 7,101,017 B2
(45) Date of Patent: Sep. 5, 2006

(54) METHOD FOR TESTING EJECTION, PRINTING APPARATUS, METHOD FOR FORMING EJECTION-TEST PATTERN, EJECTION-TEST PATTERN, COMPUTER-READABLE MEDIUM, AND PRINTING SYSTEM

(75) Inventors: Hironori Endo, Nagano-ken (JP); Shinya Komatsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 254 days.

(21) Appl. No.: 10/879,505

(22) Filed: Jun. 30, 2004

(65) Prior Publication Data

US 2005/0057598 A1 Mar. 17, 2005

(30) Foreign Application Priority Data

Jul. 1, 2003 (JP) ............................ 2003-189850

(51) Int. Cl.
*B41J 29/393* (2006.01)
*H04N 1/46* (2006.01)

(52) U.S. Cl. ........................................ 347/19; 358/504

(58) Field of Classification Search .................. 347/19; 358/504

See application file for complete search history.

(56) References Cited

U.S. PATENT DOCUMENTS 5,898,443 A * 4/1999 Yoshino et al. ............... 347/19
6,454,383 B1 * 9/2002 Lund et al. ................... 347/19

FOREIGN PATENT DOCUMENTS

JP 11-240191 A 9/1999

* cited by examiner

*Primary Examiner*—Lamson Nguyen
*Assistant Examiner*—Jannelle M. Lebron
(74) *Attorney, Agent, or Firm*—Sughrue Mion, PLLC

(57) ABSTRACT

Ejection testing of a clear ink ejecting section is carried out easily. A first test pattern, which is used for testing ejection of a color ink ejecting section, is formed by ejecting a color ink onto a medium from the color ink ejecting section for ejecting color ink; and a second test pattern, which is used for testing ejection of a clear ink ejecting section, is formed by ejecting a clear ink from the clear ink ejecting section for ejecting clear ink to form a clear ink pattern on the medium, and ejecting a color ink from the color ink ejecting section to form a color ink pattern that overlaps the clear ink pattern. The resolution of the color ink pattern is different from the resolution of the first test pattern.

18 Claims, 17 Drawing Sheets

METHOD FOR TESTING EJECTION, PRINTING APPARATUS, METHOD FOR FORMING EJECTION-TEST PATTERN, EJECTION-TEST PATTERN, COMPUTER-READABLE MEDIUM, AND PRINTING SYSTEM

CROSS-REFERENCE TO RELATED APPLICATIONS

The present application claims priority upon Japanese Patent Application No. 2003-189850 filed on Jul. 1, 2003, which is herein incorporated by reference.

BACKGROUND OF THE INVENTION

1. Field of the Invention

The present invention relates to methods for testing ejection, printing apparatuses, methods for forming ejection-test patterns, ejection-test patterns, computer-readable media, and printing systems.

2. Description of the Related Art

Inkjet printers are known as a type of printing apparatus that carries out printing by ejecting ink onto various media such as paper, cloth, and film. These inkjet printers perform color printing by ejecting color inks such as cyan (C), magenta (M), yellow (Y), and black (K) to form dots on the medium. Ink ejection is normally carried out using nozzles.

However, depending on such factors as firm fixing of the ink, a nozzle may sometimes become clogged and ink may not be properly ejected. When ink is not properly ejected from the nozzles, dots cannot be formed on the medium, and it is not possible to form a proper image. Therefore, it is necessary to test whether or not ink is being ejected properly by periodically testing nozzle ejection in order to find such nozzle ejection failure.

For this reason, it has been conventionally proposed that in serial-type printers such as inkjet printers, tests on whether or not there are defective dots are to be performed by actually carrying out printing on a recording paper (see JP 11-240191A). In this case, an image sensor is provided in the printer, and this image sensor is used to check whether or not there are defective dots by detecting the state of the printing. When there is a defective dot, the position of the defective dot is stored, and this dot is complemented during printing by using another nozzle, for example.

In recent years, printing apparatuses have been introduced in which a colorless transparent liquid called "clear ink" is ejected in addition to the color inks such as cyan (C), magenta (M), yellow (Y), and black (K). The clear ink ejected in such cases is a liquid that is ejected for the purpose of, for example, improving the quality of the printed image, and specifically, it plays: (1) the role of causing the ink to coagulate and promote fixation, (2) the role of improving the level of gloss, and (3) the role of forming a protective layer on the surface of the medium.

However, since such clear ink is colorless and transparent, it cannot be easily detected by a sensor or the like when ejected onto the medium, and for this reason, it is difficult to carry out ejection tests by forming test patterns on the medium in the same way as for color inks.

SUMMARY OF THE INVENTION

The present invention was achieved in light of the foregoing issues, and it is an object thereof to allow ejecting sections for ejecting clear ink to be easily subjected to ejection testing.

An aspect of the present invention is an ejection testing method such as the following.

A method for testing ejection, comprises the steps of:

forming a first test pattern by ejecting a color ink onto a medium from a color ink ejecting section for ejecting color ink, the first test pattern being used for testing ejection of the color ink ejecting section; and forming a second test pattern by ejecting a clear ink from a clear ink ejecting section for ejecting clear ink to form a clear ink pattern on the medium, and ejecting a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

Another aspect of the present invention is a printing apparatus such as the following.

A printing apparatus comprises:

a color ink ejecting section for ejecting a color ink;

a clear ink ejecting section for ejecting a clear ink; and a controller for controlling ink ejection from the color ink ejecting section and the clear ink ejecting section;

wherein the controller:

forms a first test pattern by causing the color ink to be ejected onto a medium from the color ink ejecting section for ejecting the color ink, the first test pattern being used for testing ejection of the color ink ejecting section; and forms a second test pattern by causing the clear ink to be ejected from the clear ink ejecting section for ejecting the clear ink to form a clear ink pattern on the medium, and by causing the color ink to be ejected from the color ink ejecting section to form a color ink pattern that overlaps the clear ink pattern, the second test pattern being used for testing ejection of the clear ink ejecting section; and wherein a resolution of the color ink pattern is different from a resolution of the first test pattern.

Furthermore, another aspect of the present invention is a method for forming an ejection-test pattern such as the following.

A method for forming an ejection-test pattern, comprises the steps of:

forming a first test pattern by ejecting a color ink onto a medium from a color ink ejecting section for ejecting color ink, the first test pattern being used for testing ejection of the color ink ejecting section; and forming a second test pattern by ejecting a clear ink from a clear ink ejecting section for ejecting clear ink to form a clear ink pattern on the medium, and ejecting a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

Furthermore, another aspect of the present invention is an ejection-test pattern such as the following.

An ejection-test pattern comprises:

a first test pattern that is formed by ejecting a color ink onto a medium from a color ink ejecting section for ejecting color ink, the first test pattern being used for testing ejection of the color ink ejecting section; and a second test pattern that includes a clear ink pattern formed by ejecting a clear ink onto the medium from a clear ink ejecting section for ejecting clear ink, and a color ink pattern formed by ejecting a color ink onto the medium from the color ink ejecting section in such a manner as to overlap the clear ink pattern, the second test pattern being used for testing ejection of the clear ink ejecting section;

wherein a resolution of the color ink pattern is different from a resolution of the first test pattern.

Furthermore, another aspect of the present invention is a computer-readable medium such as the following.

A computer-readable medium comprises:

a code for causing formation of a first test pattern by causing ejection of a color ink onto a medium from a color ink ejecting section for ejecting color ink, the first test pattern being used for testing ejection of the color ink ejecting section; and a code for causing formation of a second test pattern by causing ejection of a clear ink from a clear ink ejecting section for ejecting clear ink to form a clear ink pattern on the medium, and by causing ejection of a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

Furthermore, another aspect of the present invention is a printing system such as the following.

A printing system comprises:

a computer; and a printing apparatus that is connectable to the computer and that includes:

a color ink ejecting section for ejecting a color ink;

a clear ink ejecting section for ejecting a clear ink; and a controller for controlling ink ejection from the color ink ejecting section and the clear ink ejecting section;

wherein the controller:

forms a first test pattern by causing the color ink to be ejected onto a medium from the color ink ejecting section for ejecting the color ink, the first test pattern being used for testing ejection of the color ink ejecting section; and forms a second test pattern by causing the clear ink to be ejected from the clear ink ejecting section for ejecting the clear ink to form a clear ink pattern on the medium, and by causing the color ink to be ejected from the color ink ejecting section to form a color ink pattern that overlaps the clear ink pattern, the second test pattern being used for testing ejection of the clear ink ejecting section; and wherein a resolution of the color ink pattern is different from a resolution of the first test pattern.

Features of the present invention other than the above will become clear through the description below and the accompanying drawings.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF PREFERRED EMBODIMENTS

Figure 1:
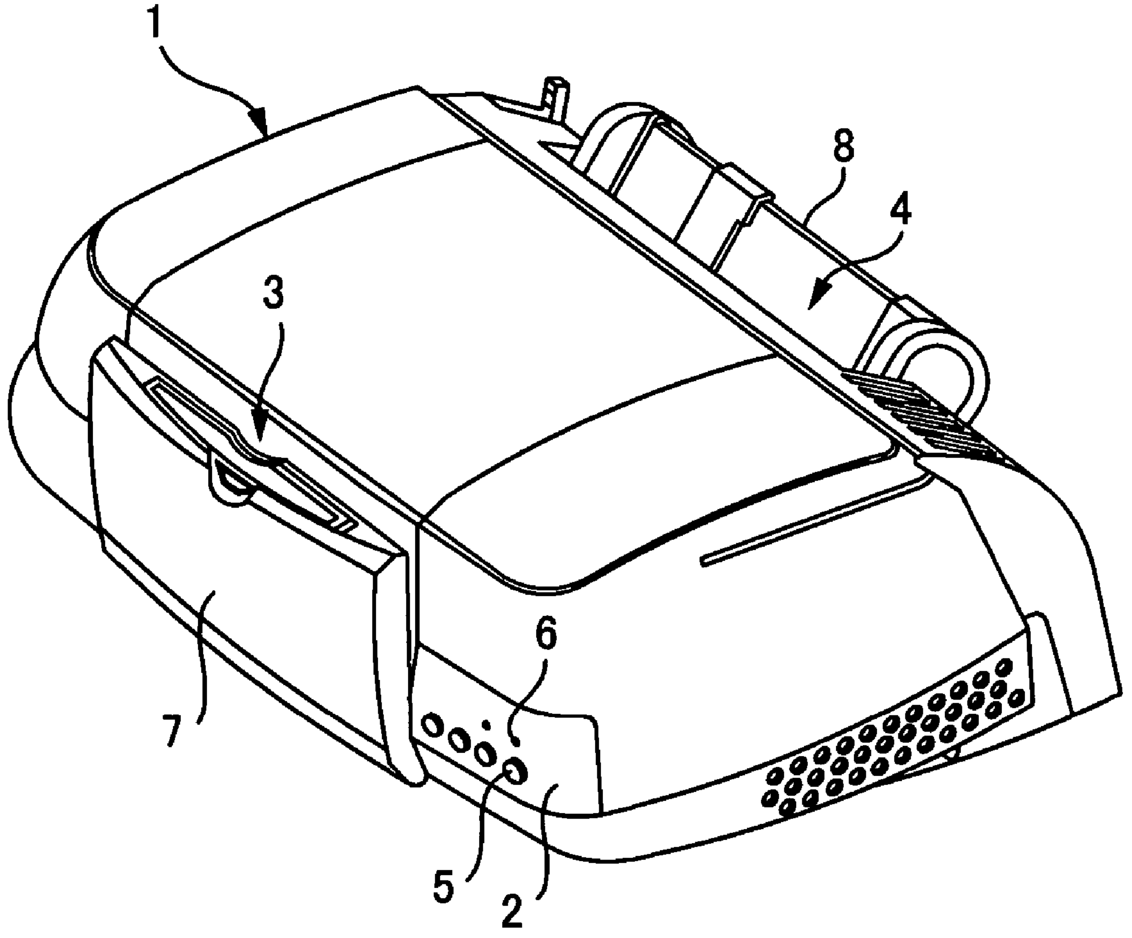
FIG. 1 is a perspective view of an inkjet printer.

At least the following matters will be made clear by the present specification and the accompanying drawings.

A method for testing ejection, comprises the steps of:

forming a first test pattern by ejecting a color ink onto a medium from a color ink ejecting section for ejecting color ink, the first test pattern being used for testing ejection of the color ink ejecting section; and forming a second test pattern by ejecting a clear ink from a clear ink ejecting section for ejecting clear ink to form a clear ink pattern on the medium, and ejecting a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

With such an ejection testing method, it is possible to make the color of areas in which the clear ink pattern and the color ink pattern overlap be different from that of other areas, and this makes it possible to easily confirm whether or not the clear ink is being ejected properly. Moreover, by making the resolution of the color ink pattern be different from the resolution of the first test pattern, which is used for testing ejection of the color ink ejecting section, the color difference can be made to stand out.

In the foregoing ejection testing method, the resolution of the color ink pattern may be lower than the resolution of the first test pattern. By lowering the resolution of the color ink pattern, the color difference between areas in which the clear ink pattern and the color ink pattern overlap and other areas can be made to stand out.

Furthermore, in the foregoing ejection testing method, the color ink ejecting section may be capable of ejecting color inks of a plurality of colors, and a color ink of one color, from among the color inks of the plurality of colors, may be used in forming the color ink pattern. By ejecting color ink of one color from among the color inks of a plurality of colors, the test pattern used in ejection testing of the clear ink ejecting section can be easily formed.

Furthermore, in the foregoing ejection testing method, the color of the color ink that is used for forming the color ink pattern may be a color ink other than a color ink of the lightest color among the color inks. By using a color ink other than a color ink of the lightest color, the test pattern for the clear ink ejecting section can be formed satisfactorily.

Furthermore, in the foregoing ejection testing method, the color ink and the clear ink may blur in a region in which the clear ink pattern and the color ink pattern overlap. By making the color ink and the clear ink blur, ejection testing of the clear ink ejecting section can be carried out easily.

Furthermore, in the foregoing ejection testing method, a darkness of a color in the region in which the clear ink pattern and the color ink pattern overlap may be different from a darkness of a color in a region in which only the color ink pattern is formed with no overlap with the clear ink pattern. Further, the darkness of the color in the region in which the clear ink pattern and the color ink pattern overlap may be darker than the darkness of the color in the region in which only the color ink pattern is formed with no overlap with the clear ink pattern. By making the darkness of the color different or even darker, ejection testing of the clear ink ejecting section can be carried out easily.

Furthermore, in the foregoing ejection testing method, a plurality of nozzles for ejecting the clear ink may be provided as the clear ink ejecting section, and the clear ink pattern may have patterns each for separate ones of the nozzles. By forming such patterns, ejection testing can be carried out easily in the case in which a plurality of nozzles for ejecting clear ink are provided.

Furthermore, in the foregoing ejection testing method, the second test pattern may be formed on the same medium as the first test pattern. By forming these two test patterns on the same medium, it is possible to reduce wastage of media.

Furthermore, in the foregoing ejection testing method, whether or not there is an ejection failure in the clear ink ejecting section or the color ink ejecting section may be checked based on an output from a sensor that detects the first test pattern or the second test pattern. By doing this, it is possible to easily check the presence or absence of an ejection failure in the clear ink ejecting section and the color ink ejecting section.

Furthermore, in the foregoing ejection testing method, the color ink ejecting section and the clear ink ejecting section may be provided in a print head that is arranged to be movable relatively with respect to the medium. Furthermore, the medium may be carried in a direction that intersects with a movement direction of the print head. By doing this, printing can be carried out easily.

Furthermore, an ejection testing method such as the following is achievable.

A method for testing ejection, comprises the steps of:

forming a first test pattern by ejecting a color ink onto a medium from a color ink ejecting section for ejecting color ink, the first test pattern being used for testing ejection of the color ink ejecting section; and forming a second test pattern by ejecting a clear ink from a clear ink ejecting section for ejecting clear ink to form a clear ink pattern on the medium, and ejecting a color ink from the color ink ejecting section to form a color ink pattern that overlaps the clear ink pattern, the second test pattern being used for testing ejection of the clear ink ejecting section;

wherein the resolution of the color ink pattern is lower than the resolution of the first test pattern;

wherein the color ink ejecting section is capable of ejecting color inks of a plurality of colors, and a color ink of one color, from among the color inks of the plurality of colors, is used in forming the color ink pattern;

wherein the color of the color ink ejected onto a region in which the clear ink is to be adhering is a color ink other than a color ink of the lightest color among the color inks;

wherein the color ink and the clear ink blur in a region in which the clear ink pattern and the color ink pattern overlap;

wherein a darkness of a color in the region in which the clear ink pattern and the color ink pattern overlap is darker than a darkness of a color in a region in which only the color ink pattern is formed with no overlap with the clear ink pattern;

wherein a plurality of nozzles for ejecting the clear ink are provided as the clear ink ejecting section, and the clear ink pattern has patterns each for separate ones of the nozzles;

wherein whether or not there is an ejection failure in the clear ink ejecting section or the color ink ejecting section is checked based on an output from a sensor that detects the first test pattern or the second test pattern; and wherein the color ink ejecting section and the clear ink ejecting section are provided in a print head that is arranged to be movable relatively with respect to the medium.

Furthermore, a printing apparatus such as the following is achievable.

A printing apparatus comprises:

a color ink ejecting section for ejecting a color ink;

a clear ink ejecting section for ejecting a clear ink; and a controller for controlling ink ejection from the color ink ejecting section and the clear ink ejecting section;

wherein the controller:

forms a first test pattern by causing the color ink to be ejected onto a medium from the color ink ejecting section for ejecting the color ink, the first test pattern being used for testing ejection of the color ink ejecting section; and forms a second test pattern by causing the clear ink to be ejected from the clear ink ejecting section for ejecting the clear ink to form a clear ink pattern on the medium, and by causing the color ink to be ejected from the color ink ejecting section to form a color ink pattern that overlaps the clear ink pattern, the second test pattern being used for testing ejection of the clear ink ejecting section; and wherein a resolution of the color ink pattern is different from a resolution of the first test pattern.

Furthermore, a method for forming an ejection-test pattern such as the following is achievable.

A method for forming an ejection-test pattern, comprises the steps of:

forming a first test pattern by ejecting a color ink onto a medium from a color ink ejecting section for ejecting color ink, the first test pattern being used for testing ejection of the color ink ejecting section; and forming a second test pattern by ejecting a clear ink from a clear ink ejecting section for ejecting clear ink to form a clear ink pattern on the medium, and ejecting a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

Furthermore, an ejection-test pattern such as the following is achievable.

An ejection-test pattern comprises:

a first test pattern that is formed by ejecting a color ink onto a medium from a color ink ejecting section for ejecting color ink, the first test pattern being used for testing ejection of the color ink ejecting section; and a second test pattern that includes a clear ink pattern formed by ejecting a clear ink onto the medium from a clear ink ejecting section for ejecting clear ink, and a color ink pattern formed by ejecting a color ink onto the medium from the color ink ejecting section in such a manner as to overlap the clear ink pattern, the second test pattern being used for testing ejection of the clear ink ejecting section;

wherein a resolution of the color ink pattern is different from a resolution of the first test pattern.

Furthermore, a computer-readable medium such as the following is achievable.

A computer-readable medium comprises:

a code for causing formation of a first test pattern by causing ejection of a color ink onto a medium from a color ink ejecting section for ejecting color ink, the first test pattern being used for testing ejection of the color ink ejecting section; and a code for causing formation of a second test pattern by causing ejection of a clear ink from a clear ink ejecting section for ejecting clear ink to form a clear ink pattern on the medium, and by causing ejection of a color ink from the color ink ejecting section to form a color ink pattern that overlaps the clear ink pattern, the second test pattern being used for testing ejection of the clear ink ejecting section;

wherein a resolution of the color ink pattern is different from a resolution of the first test pattern.

Furthermore, a printing system such as the following is achievable.

A printing system comprises:

a computer; and a printing apparatus that is connectable to the computer and that includes:

a color ink ejecting section for ejecting a color ink;

a clear ink ejecting section for ejecting a clear ink; and a controller for controlling ink ejection from the color ink ejecting section and the clear ink ejecting section;

wherein the controller:

forms a first test pattern by causing the color ink to be ejected onto a medium from the color ink ejecting section for ejecting the color ink, the first test pattern being used for testing ejection of the color ink ejecting section; and forms a second test pattern by causing the clear ink to be ejected from the clear ink ejecting section for ejecting the clear ink to form a clear ink pattern on the medium, and by causing the color ink to be ejected from the color ink ejecting section to form a color ink pattern that overlaps the clear ink pattern, the second test pattern being used for testing ejection of the clear ink ejecting section; and wherein a resolution of the color ink pattern is different from a resolution of the first test pattern.

=== Outline of Printing Apparatus ===

Figure 2:
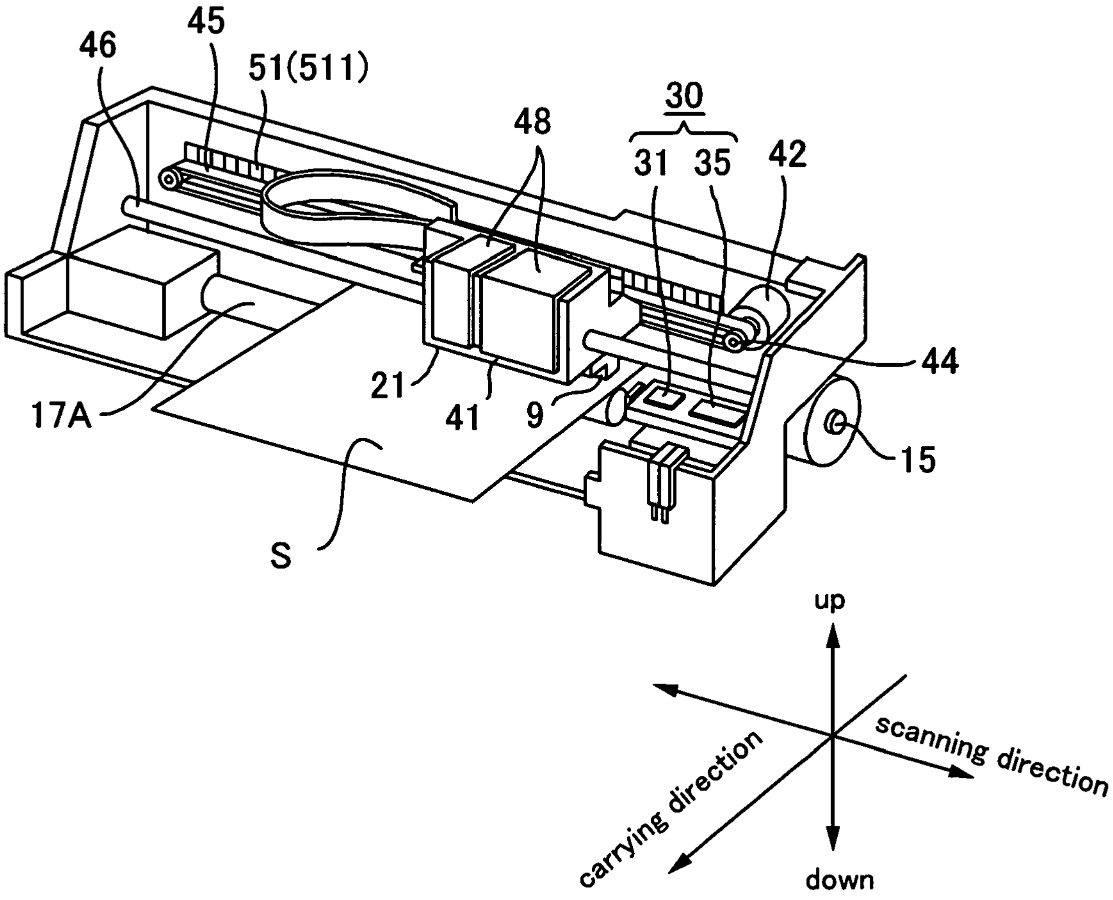
FIG. 2 is a diagram of the internal configuration of the inkjet printer.
Figure 3:
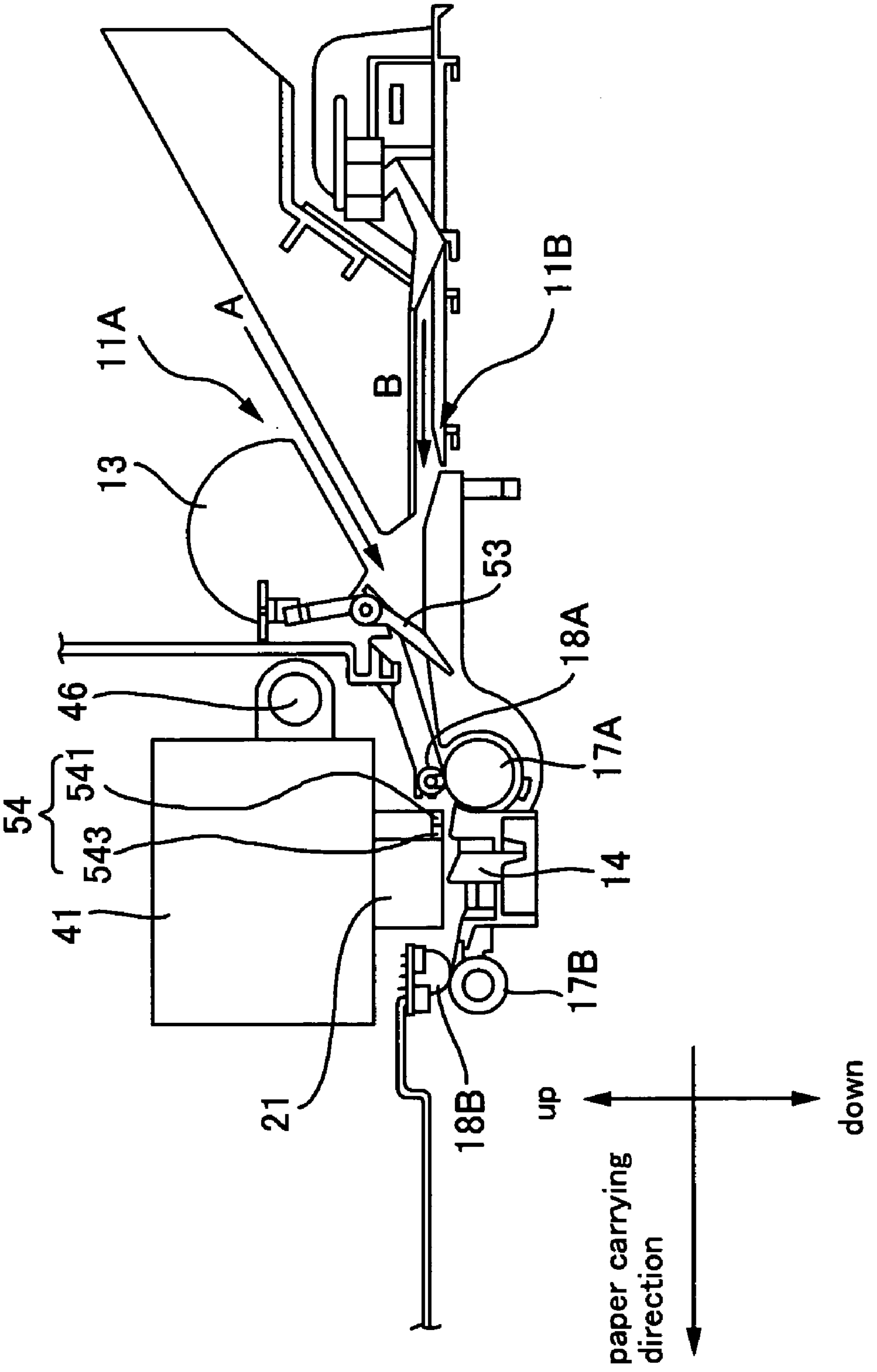
FIG. 3 is a cross sectional view of a carrying section of the inkjet printer.
Figure 4:
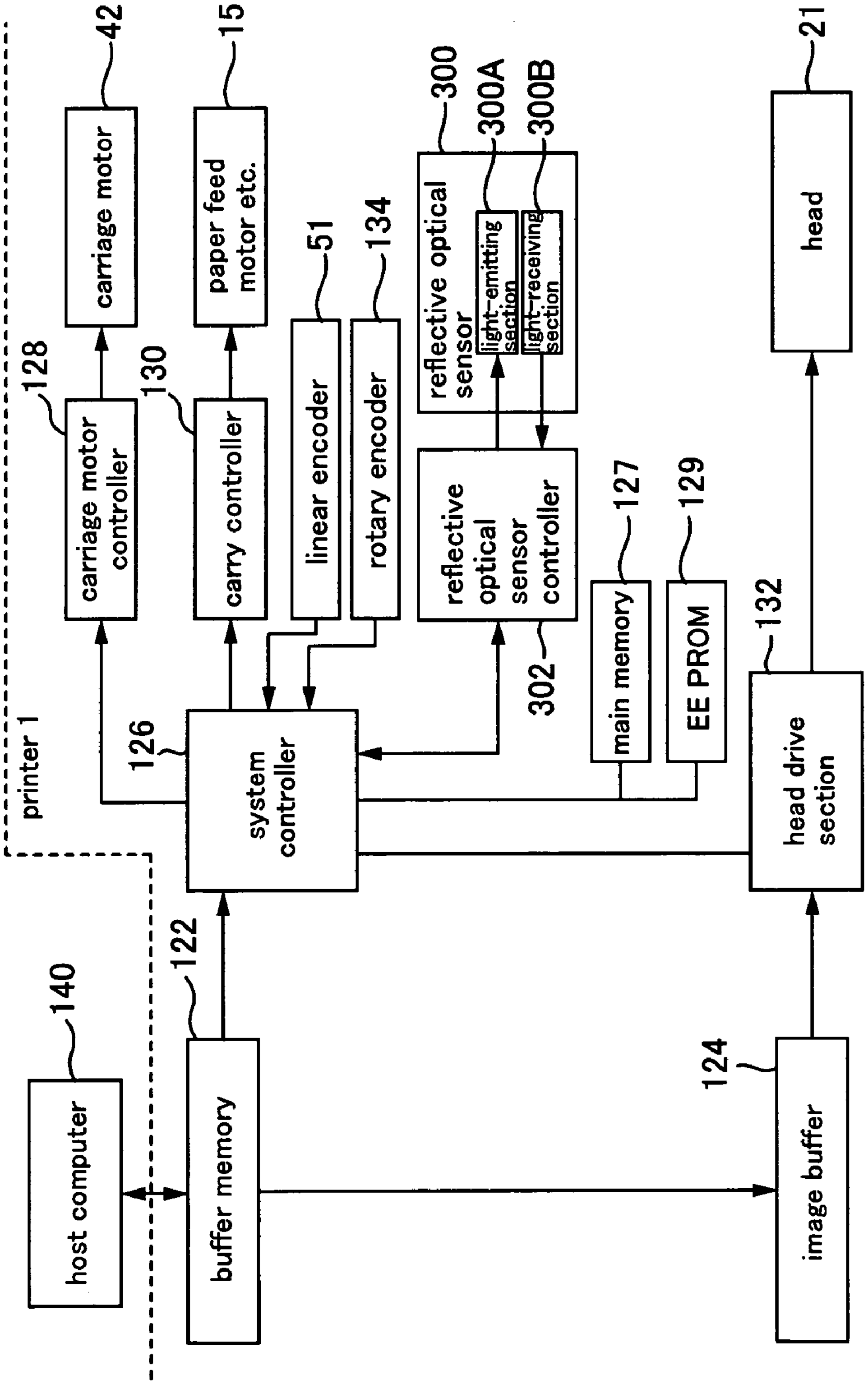
FIG. 4 is a block diagram showing a system configuration of the inkjet printer.

An embodiment of a printing apparatus according to the present invention is described with an inkjet printer serving as an example. FIGS. 1 to 4 show an example of an inkjet printer. FIGS. 1 to 4 are figures for describing the outline of one embodiment of the inkjet printer 1. FIG. 1 shows an external view of one embodiment of the inkjet printer 1. FIG. 2 show the internal configuration of the inkjet printer 1. FIG. 3 shows the carrying section of the inkjet printer 1. FIG. 4 is a block diagram showing the system configuration of the inkjet printer.

As shown in FIG. 1, the inkjet printer 1 is provided with a structure in which a medium such as print paper that is supplied from the rear side is discharged from the front side. A control panel 2 and a discharge portion 3 are arranged at the front side portion, and a paper supply portion 4 is provided at the rear side portion. Various control buttons 5 and display lamps 6 are arranged on the control panel 2. Furthermore, a discharge tray 7 is arranged at the discharge portion 3 and covers the paper discharge outlet when not in use. A paper supply tray 8 is arranged at the paper supply portion 4 to hold cut paper (not shown). It should be noted that the inkjet printer 1 may be provided with a paper feed structure that is capable of being used in printing not only print paper in single sheets, such as cut paper, but also media that are continuous, such as roll paper.

As shown in FIG. 2, a carriage 41 is arranged inside the inkjet printer 1. The carriage 41 is arranged such that it can move relatively in a predetermined direction (the scanning direction shown in the drawing in this embodiment). A carriage motor (hereafter also referred to as "CR motor") 42, a pulley 44, a timing belt 45, and a guide rail 46 are provided in the vicinity of the carriage 41. The carriage motor 42 is constituted by a DC motor or the like and functions as a driving force for moving the carriage 41 relatively in the predetermined direction. Furthermore, the timing belt 45 is connected to the carriage motor 42 via the pulley 44, and a portion of it is also connected to the carriage 41, such that the carriage 41 is moved relatively in the predetermined direction by the rotational force of the carriage motor 42. The guide rail 46 guides the carriage 41 along the predetermined direction. In addition to these, also provided in the vicinity of the carriage 41 are a linear encoder 51 that detects a position of the carriage 41, a carry roller 17A for carrying a medium S along a direction that intersects with the movement direction of the carriage 41, and a paper feed motor 15 that rotationally drives the carry roller 17A.

On the other hand, ink cartridges 48 that contain the various inks and a print head 21 that carries out printing on the medium S are arranged at the carriage 41. The ink cartridges 48 contain color inks such as yellow (Y), magenta (M), cyan (C), and black (K) for example, and are mounted in a carriage mounting portion provided in the carriage 41 so as to be removable. On the other hand, in this embodiment, the print head 21 carries out printing by ejecting ink on the medium S. To do so, a multitude of nozzles for ejecting ink are provided in the print head 21. Detailed description of the ink ejecting mechanism of the print head 21 is given later.

Additionally, a cleaning unit 30 for clearing clogging of the nozzles of the print head 21 is arranged inside the inkjet printer 1. The cleaning unit 30 has a pump device 31 and a capping device 35. The pump device 31 sucks out ink from the nozzles in order to prevent clogging of the nozzles of the print head 21 and is operated by a pump motor (not shown). On the other hand, the capping device 35 is for sealing the nozzles of the head 21 when printing is not being performed (for example, during standby) so that the nozzles of the print head 21 are kept from clogging.

The following is a description of the configuration of a carrying section (which corresponds to carrying means in the present invention) of the inkjet printer 1. As shown in FIG. 3, the carrying section has a paper insert opening 11A and a roll paper insert opening 11B, a paper supply motor (not shown), a paper supply roller 13, a platen 14, a paper feed motor (hereinafter, also referred to as PF motor) 15, a carry roller 17A and paper discharge rollers 17B, and free rollers 18A and free rollers 18B.

The paper insert opening 11A is where paper S, which is a medium, is inserted. The paper supply motor (not shown) is a motor for carrying the paper S that has been inserted into the paper insert opening 11A into the printer 1, and is constituted by a pulse motor or the like. The paper supply roller 13 is a roller for automatically carrying the medium S that has been inserted into the paper insert opening 11A into the printer 1, and is driven by the paper supply motor. The paper supply roller 13 has a transverse cross-sectional shape that is substantially the shape of the letter D. The peripheral length of a circumference section of the paper supply roller 13 is set longer than the carrying distance to the PF motor 15, so that using this circumference section, the medium S can be carried up to the PF motor 15. It should be noted that a plurality of sheets of the medium S are prevented from being supplied at one time by the rotational drive force of the paper supply roller 13 and the friction resistance of separating pads (not shown).

The platen 14 is a support means that supports the paper S during printing. The PF motor 15 is a motor for feeding paper, which is an example of a medium S, in the paper carrying direction, and is constituted by a DC motor. The carry roller 17A is a roller for feeding the paper S, which has been carried into the printer 1 by the paper supply roller 13, up to a printable region, and is driven by the PF motor 15. The free rollers 18A are provided in a position that is in opposition to the carry roller 17A, and push the paper S toward the carry roller 17A by sandwiching the paper S between them and the carry roller 17A.

The paper discharge rollers 17B are rollers for discharging the paper S for which printing has finished to outside the printer 1. The paper discharge rollers 17B are driven by the PF motor 15 through a gear wheel that is not shown in the drawings. The free rollers 18B are provided in a position that is in opposition to the paper discharge rollers 17B, and push the paper S toward the paper discharge rollers 17B by sandwiching the paper S between them and the paper discharge rollers 17B.

The following is a description concerning the system configuration of the inkjet printer 1. As shown in FIG. 4, the inkjet printer 1 is provided with a buffer memory 122, an image buffer 124, a system controller 126, which is an example of a controller, a main memory 127, and an EEPROM 129. The buffer memory 122 receives and temporarily stores various data such as print data sent from a host computer 140. The image buffer 124 obtains the received print data from the buffer memory 122 and stores it. Furthermore, the main memory 127 is constituted by a ROM and a RAM, for example.

On the other hand, the system controller 126 reads out a control program from the main memory 127 and controls the entire printer unit 20 in accordance with the control program. It should be noted that the control program (codes) may be stored on a computer-readable medium.

The system controller 126 of the present embodiment is connected to a carriage motor controller 128, a carry controller 130, a head drive section 132, a rotary encoder 134, and a linear encoder 136. The carriage motor controller 128 performs drive control of the carriage motor 42 for such aspects as rotational direction, number of rotations, torque and the like. Furthermore, the head drive section 132 performs drive control of the print head 21. The carry controller 130 controls the various drive motors that are arranged in a carry system, such the paper feed motor 15 that rotationally drives the carry roller 17A.

Print data that have been transferred from the host computer 140 are temporarily held in the buffer memory 122. Necessary information contained in the print data held here is read out by the system controller 126. Based on the information that is read out, the system controller 126 controls the carriage motor controller 128, the carry controller 130, and the head drive section 132 in accordance with a control program while referencing the output from the linear encoder 136 and the rotary encoder 134.

Print data for a plurality of color components received by the buffer memory 122 is stored in the image buffer 124. The head drive section 132 obtains the print data for each of the color components from the image buffer 124 in accordance with control signals from the system controller 126, and drives and controls the nozzles for each color provided in the print head 21 based on the print data.

Additionally, the system controller 126 of the present embodiment is capable of communicating with a reflective optical sensor controller 302. The reflective optical sensor controller 302 performs drive control of a reflective optical sensor 300. The reflective optical sensor 300 is provided with a light-emitting section 300A constituted by a light-emitting diode or the like and a light-receiving section 300B constituted by a phototransistor or the like. The reflective optical sensor controller 302 fulfils such roles as performing light-emission control of the light-emitting section 300A of the reflective optical sensor 300 and transmitting to the system controller 126 information about the reflected light received at the light-receiving section 300B. The reflective optical sensor 300 is arranged on the carriage 41 such that light can be emitted from the light-emitting section 300A toward the medium S and moves with the carriage 41 relatively with respect to the medium S.

=== Example Configuration of Reflective Optical Sensor ===

Figure 5:
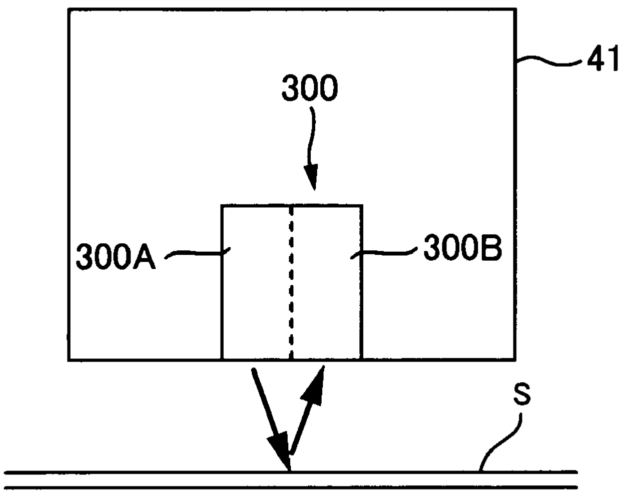
FIG. 5 is an explanatory diagram showing a configuration of a reflective optical sensor.

FIG. 5 is a schematic diagram showing an embodiment in which the reflective optical sensor 300 is used as a sensor. As shown in this figure, the reflective optical sensor 300 is arranged on the carriage 41 such that it moves with the carriage 41 relatively with respect to the medium S.

The light-emitting section 300A of the reflective optical sensor 300 is set up such that light is irradiated toward the medium S at a predetermined angle. On the other hand, the light-receiving section 300B is configured such that light (including regular reflection light and diffused reflection light) reflected by the surface of the medium S is detected. In this way, the reflective optical sensor 300 is able to measure the amount of reflected light received by the light-receiving section 300B and detect such aspects as glossiness of the medium S and color darkness. The detection results of the reflective optical sensor 300 are output to the system controller 126.

It should be noted that in this embodiment the light-emitting section 300A and the light-receiving section 300B are arranged adjacent to each other, but they may be arranged separately with a spacing between each other.

=== Linear Encoder ===

Figure 6:
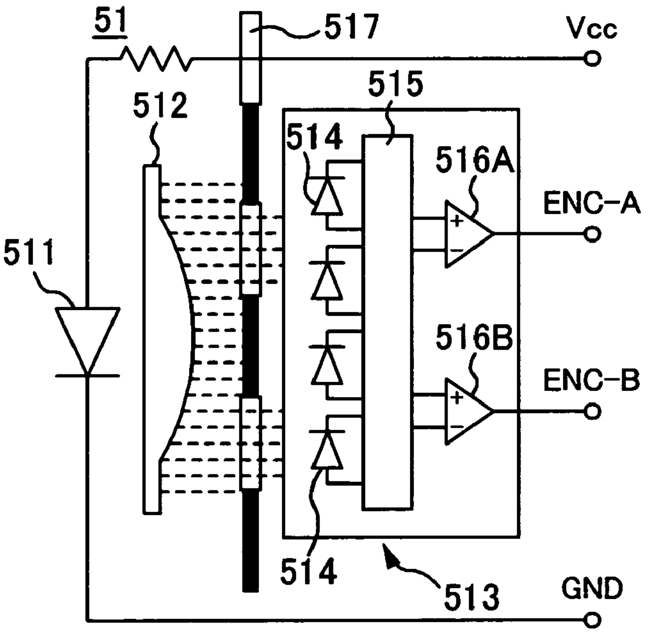
FIG. 6 is an explanatory diagram of a linear encoder.

The following is a detailed description of the linear encoder 51. FIG. 6 schematically shows the configuration of the linear encoder 51 provided to the carriage 41.

The linear encoder 51 is provided with a light-emitting diode 511, a collimating lens 512, and a detection processing section 513. The detection processing section 513 has a plurality (for instance, four) photodiodes 514, a signal processing circuit 515, and, for example, two comparators 516A and 516B.

The light-emitting diode 511 emits light when a voltage VCC is applied to it via resistors on both sides. This light is condensed into parallel light by the collimating lens 512 and passes through a linear encoder code plate 517. The linear encoder code plate 517 is provided with slits at a predetermined spacing (for example, 1/180 inch (1 inch=2.54 cm)).

The parallel light that passes through the linear encoder code plate 517 then passes through stationary slits, which are not shown, and is incident on the photodiodes 514, where it is converted into electric signals. The electric signals that are output from the four photodiodes 514 are subjected to signal processing in the signal processing circuit 515, and the signals that are output from the signal processing circuit 515 are compared in the comparators 516A and 516B, and the results of these comparisons are output as pulses. A pulse ENC-A and pulse ENC-B that are output from the comparators 516A and 516B become the output of the linear encoder 51.

FIG. 7 shows timing charts of the waveforms of the two output signals of the linear encoder 51 when the carriage motor 42 is rotating forward, and when it is rotating in reverse.

Figure 7A:
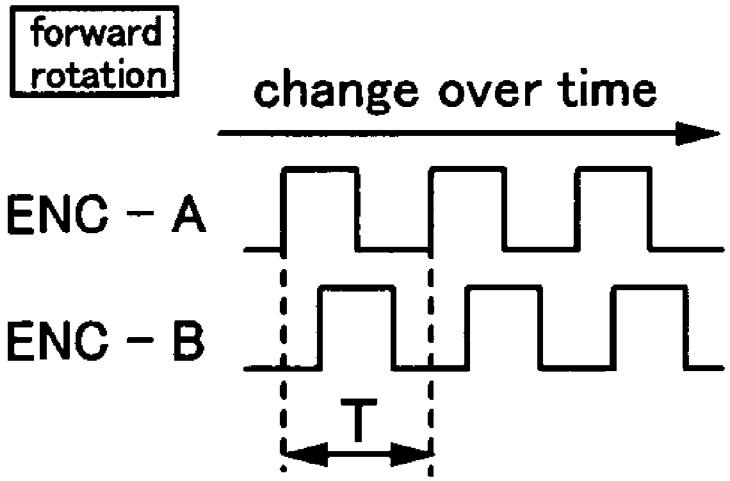
FIG. 7 shows timing charts of output waveforms of the linear encoder.
Figure 7B:
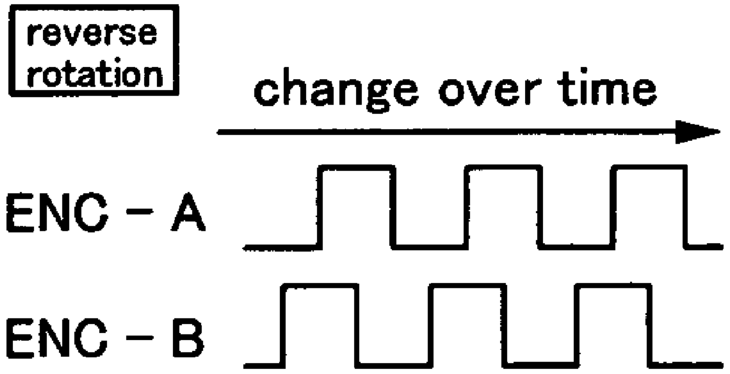

As shown in FIGS. 7A and 7B, the phases of the pulse ENC-A and the pulse ENC-B are misaligned by 90 degrees both when the carriage motor 42 is rotating forward and when it is rotating in reverse. When the carriage motor 42 is rotating forward, that is, when the carriage 41 is moving along the guide rail 46, then, as shown in FIG. 7A, the phase of the pulse ENC-A leads the phase of the pulse ENC-B by 90 degrees. On the other hand, when the carriage motor 42 is rotating in reverse, then, as shown in FIG. 7B, the phase of the pulse ENC-A is delayed by 90 degrees with respect to the phase of the pulse ENC-B. A single period T of the pulse ENC-A and the pulse ENC-B is equivalent to the time during which the carriage 41 is moved by the slit spacing of the linear encoder code plate 517.

Then, the rising edge and the rising edge of the output pulses ENC-A and ENC-B of the linear encoder 51 are detected, and the number of detected edges is counted. The rotational position of the carriage motor 42 is calculated based on the value of the count. With respect to the calculation, when the carriage motor 42 is rotating forward, a "+1" is added for each detected edge, and when it is rotating in reverse, a "−1" is added for each detected edge. The period of the pulses ENC-A and ENC-B is equal to the time from when one slit of the linear encoder code plate 517 passes the linear encoder 51 to when the next slit passes the linear encoder 51, and the phases of the pulse ENC-A and the pulse ENC-B are misaligned by 90 degrees. Accordingly, a count number of "1" of the calculation corresponds to ¼ of the slit spacing of the linear encoder code plate 517. T*herefore*, if the counted value is multiplied by ¼ of the slit *spacing*, then the amount that the carriage motor 42 has moved from the rotational position corresponding to the count value "0" can be obtained based on this product. The resolution of the linear encoder 51 at this time is ¼ the slit spacing of the linear encoder code plate 517.

=== Print Head ===

Figure 8:
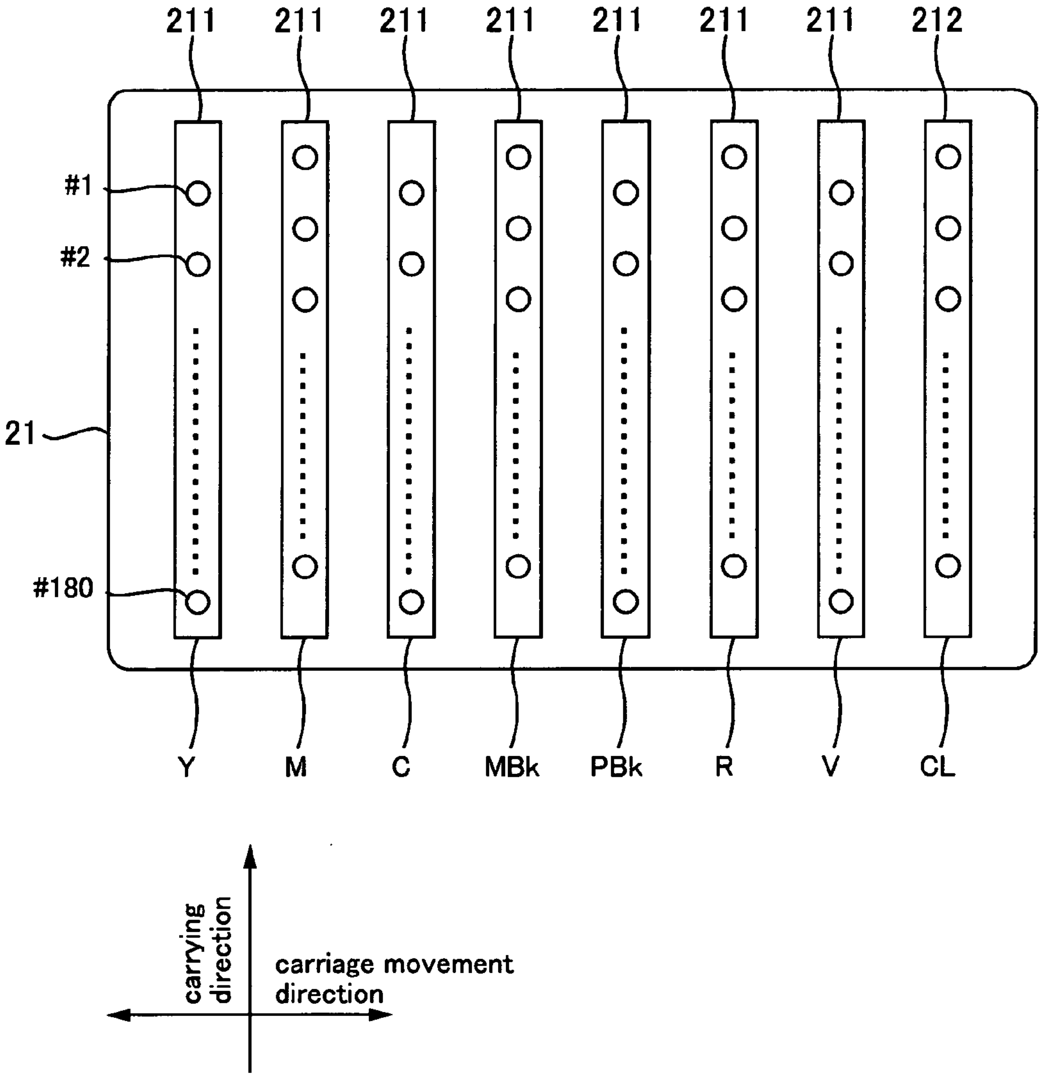
FIG. 8 is a diagram showing the print head as viewed from the bottom surface.

FIG. 8 is a diagram showing the arrangement of ink nozzles on the bottom surface of the print head 21. As shown in FIG. 8, a nozzle row 211 made of a plurality of nozzles #1 to #180 is arranged on the bottom surface of the print head 21 for each of the colors yellow (Y), magenta (M), cyan (C), matte black (MBk), photo black (PBk), red (R), and violet (V). Further still, in the present embodiment, in addition to the color nozzle rows 211, a clear ink (CL) nozzle row 212 (this corresponds to the clear ink ejecting section in the present invention) is provided. It should be noted that the color nozzle rows 211 of yellow (Y), magenta (M), cyan (C), matte black (MBk), photo black (PBk), red (R), and violet (V) correspond to the color ink ejecting sections in the present invention. On the other hand, the clear ink (CL) nozzle row 212 corresponds to the clear ink ejecting section in the present invention. Furthermore, in the present invention, colors other than those mentioned above, such as blue and green, may be used as color inks.

The nozzles #1 to #180 in each of the nozzle rows 211 and 212 are arranged linearly along the carrying direction of the paper 7. The nozzle rows 211 and 212 are arranged parallel to and spaced from one another in the movement direction (scanning direction) of the print head 21. Each of the nozzles #1 to #180 is provided with a piezo element (not shown) as a drive element for ejecting droplets of ink.

When a voltage of a predetermined duration is applied between electrodes provided on both sides of the piezo element, the piezo element expands while the voltage is being applied, thereby changing the shape of the side wall of the ink channel. As a result, the volume of the ink channel is constricted by an amount of the expansion of the piezo element, and ink corresponding to this amount of constriction becomes an ink droplet, which is ejected from the relevant nozzle #1 to #180 of a relevant color.

Figure 9:
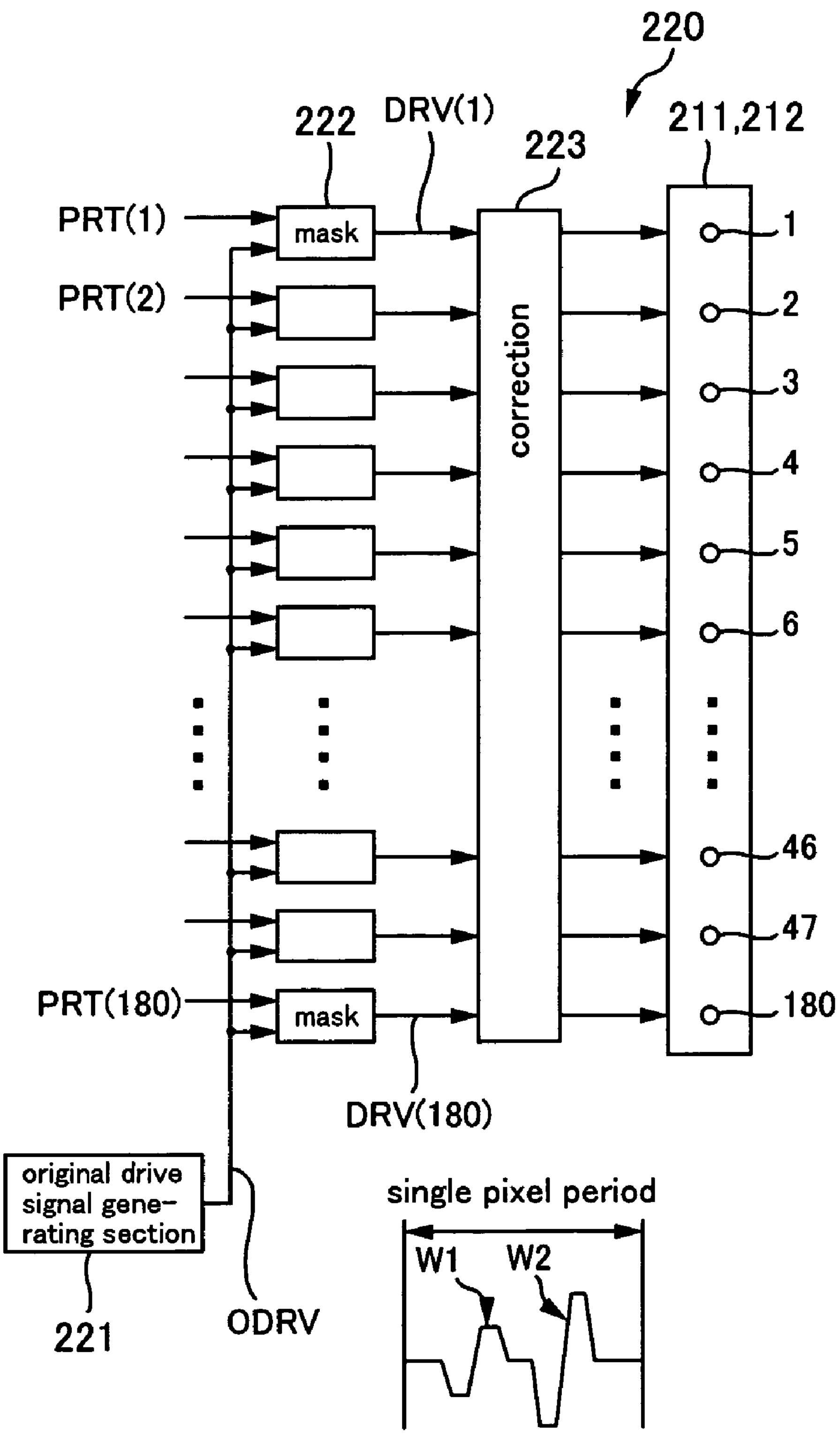
FIG. 9 is a circuit diagram showing one embodiment of a nozzle drive circuit.

FIG. 9 shows a drive circuit 220 of the nozzles #1 to #180. As shown in FIG. 9, the drive circuit 220 is provided with an original drive signal generating section 221, a plurality of mask circuits 222, and a drive signal correction circuit 223. The original drive signal generating section 221 creates an original signal ODRV that is shared by the nozzles #1 to #180. As shown in a lower portion of FIG. 9, the original signal ODRV is a signal that includes two pulses, a first pulse W1 and a second pulse W2 during the main scanning period of a single pixel (during the period that the carriage 41 crosses over a single pixel). The original signal ODRV created by the original drive signal generating section 221 is output to each mask circuit 222.

The mask circuits 222 are provided each corresponding to one of the plurality of piezo elements for driving the nozzles #1 to #180 of the print head 21. Each mask circuit 222 receives the original signal ODRV from the original signal generating section 221 and also receives print signals PRT (i). The print signal PRT(i) is pixel data corresponding to each pixel, and is a binary signal having 2-bit information corresponding to a single pixel. The bits respectively correspond to the first pulse W1 and the second pulse W2. The mask circuits 222 are gates for blocking the original signal ODRV or allowing it to pass depending on the level of the print signal PRT(i). That is, when the print signal PRT(i) is level "0," the pulse of the original signal ODRV is blocked, whereas when the print signal PRT(i) is level "1," the pulse corresponding to the original signal ODRV is allowed to pass as it is and is output to the drive signal correction circuit 223 as a drive signal DRV.

The drive signal correction circuit 223 performs correction by shifting the timing of the waveforms of the drive signals DRV from the mask circuits 222. The width by which the timing of the waveforms of the drive signals DRV, which are corrected here, is shifted is adjusted as appropriate based on instructions from the system controller 126, for example. That is, based on instructions from the system controller 126 for example, the drive signal correction circuit 223 can shift the waveforms of the drive signals DRV to a desired timing. The drive signals DRV that are corrected by the drive signal correction circuit 223 are output to the piezo elements of the nozzles #1 to #10. The piezo element of each nozzle #1 to #10 is driven by the drive signal DRV from the drive signal correction circuit 223 and ejects ink.

Figure 10:
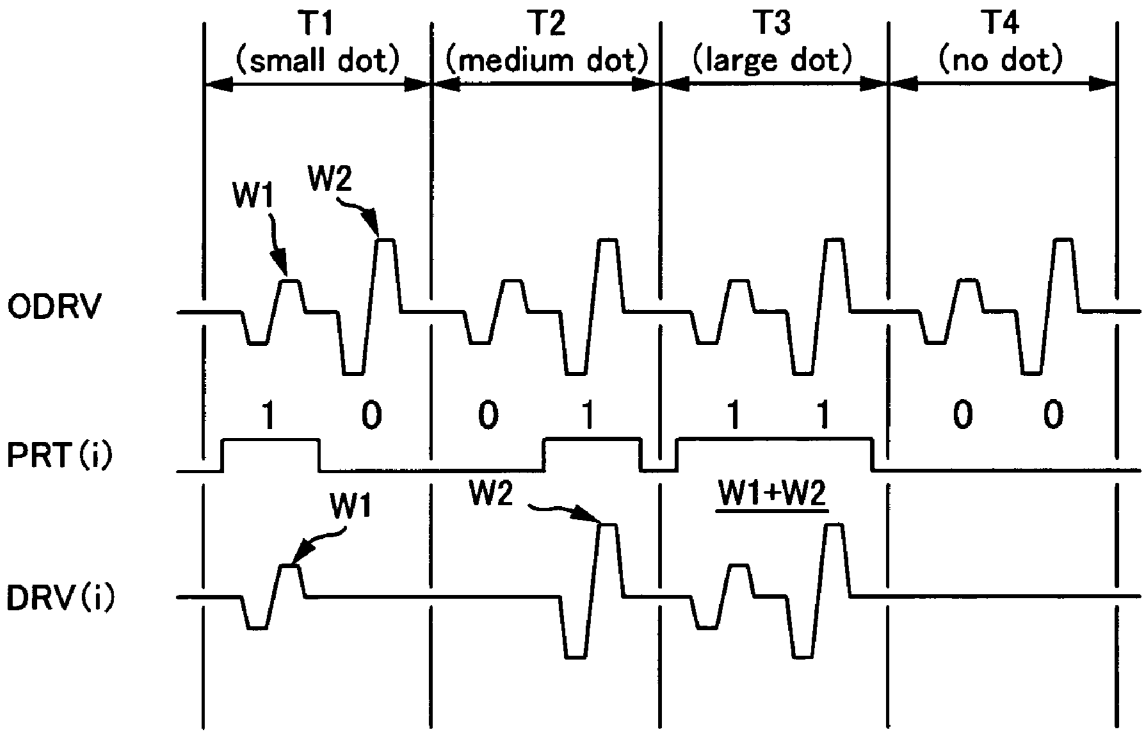
FIG. 10 is a timing chart of the original signal ODRV, the print signal PRT(i), and the drive signal DRV(i) indicating the operation of the drive signal generating section.

FIG. 10 is a timing chart of the original signal ODRV, the print signal PRT(i), and the drive signal DRV(i) indicating the operation of the drive signal generating section. As shown in FIG. 10, the original signal ODRV generates a first pulse W1 and a second pulse W2 in that order during each pixel period T1, T2, T3, and T4. It should be noted that "pixel period" has the same meaning as the movement interval of the carriage 41 for a single pixel.

When the print signal PRT(i) corresponds to the two bits of pixel data "1,0" then only the first pulse W1 is output in the first half of the pixel period. Accordingly, a small ink droplet is ejected from the nozzle, forming a small-sized dot (small dot) on the medium S. When the print signal PRT(i) corresponds to the two bits of pixel data "0,1" then only the second pulse W2 is output in the second half of the pixel period. Accordingly, a medium-sized ink droplet is ejected from the nozzle, forming a medium-sized dot (medium dot) on the medium S. Furthermore, when the print signal PRT(i) corresponds to the two bits of pixel data "1,1" then the first pulse W1 and the second pulse W2 are output during the pixel period. Accordingly, a large ink droplet is ejected from the nozzle, forming a large-sized dot (large dot) on the medium S. As described above, the drive signal DRV(i) in a single pixel period is shaped so that it may have three different waveforms corresponding to three different values of the print signal PRT(i), and based on these signals, the print head 21 can form dots of three different sizes and can adjust the amount of ejected ink within each pixel period. Furthermore, when the print signal PRT(i) corresponds to the two bits of pixel data "0,0" as in the pixel period T4, then no ink droplet is ejected from the nozzle and no dot is formed on the medium S.

In the inkjet printer 1 according to the present embodiment, the drive circuits 220 of the nozzles #1 to #180 are arranged separately for each of the nozzle rows 211 and 212, that is, for each of the colors yellow (Y), magenta (M), cyan (C), matte black (MBk), photo black (PBk), red (R), and violet (V), and for clear ink (CL), such that piezo elements are driven separately for each nozzle row 211 and 212.

=== Color Inks And Clear Ink ===

<Color Inks>

"Color ink" herein refers to colored, non-transparent inks such as yellow (Y), magenta (M), cyan (C), and black (K). These color inks are made of dye ink, pigment ink, etc., and in addition to the above-mentioned four inks, these colors include light magenta (LM), light cyan (LC), and dark yellow (DY), as well as such colors as blue and green.

<Clear Ink>

In contrast to color inks, "clear ink" generally refers to uncolored, transparent inks. However, there is no particular limitation to such uncolored, transparent inks, and it broadly refers to inks that are difficult to be detected by sensors such as the above-described reflective optical sensor 300 when printed on the medium S, and includes colored transparent inks and colored non-transparent inks. That is, in contrast to "color inks", which are colored, non-transparent inks such as yellow (Y), magenta (M), cyan (C), and black (K) and detectable by the sensor mounted in the printing apparatus such as the reflective optical sensor 300 when adhering to the medium S, "clear ink" is an ink that, even when adhering to the medium S, is extremely difficult to specify, with a sensor, whether it is adhering to the medium or not.

=== Ejection Testing Procedure ===

With the inkjet printer 1 according to the present embodiment, it is possible to test whether or not the above-described color inks of each color and clear ink are properly ejected from the nozzles #1 to #180 of the nozzle rows 211 and 212. This ejection testing involves actually ejecting color inks or clear ink from the nozzles #1 to #180 to form predetermined test patterns on the medium S. Then, if the test result is that an ejection failure, such as clogging, is discovered in the nozzles #1 to #180, cleaning of the nozzles #1 to #180 is carried out.

It should be noted that, in the present embodiment, the system controller 126, which serves as a controller, controls the ejection of ink from the color ink ejecting sections and the clear ink ejecting section. Furthermore, as a controller, the system controller 126 causes color ink to be ejected from the color ink ejecting sections that eject color ink to form on the medium a first test pattern used in ejection testing of the color ink ejecting sections, and causes clear ink to be ejected from the clear ink ejecting section that ejects clear ink to form a clear ink pattern on the medium and causes color ink to be ejected from the color ink ejecting sections to form a color ink pattern that overlaps the clear ink pattern to form a second test pattern that is used in ejection testing of the clear ink ejecting section. Furthermore, operations performed by the system controller 126 are carried out in accordance to predetermined codes and these codes can be stored on a computer-readable medium.

Figure 11:
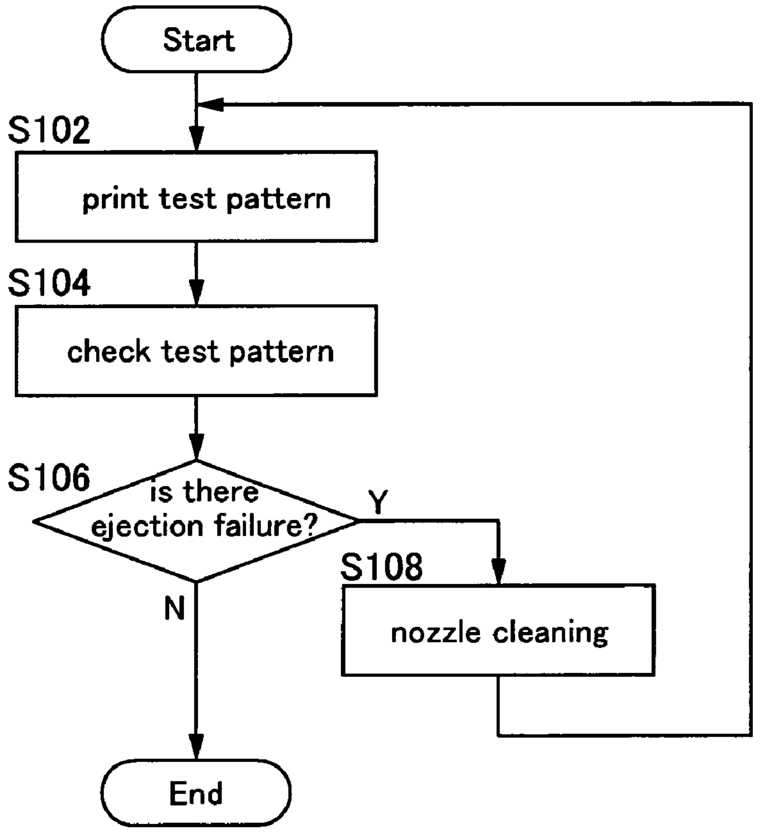
FIG. 11 is a flowchart showing an example of an ejection testing procedure.

FIG. 11 shows an example of an ejection testing procedure for an inkjet printer according to the present embodiment. As shown in FIG. 11, when carrying out ejection testing, first, color ink or clear ink is ejected from the nozzles #1 to #180 of the nozzle rows 211 and 212 to form predetermined test patterns on the medium S (S102). It should be noted that the test patterns that are formed are different between when carrying out ejection testing of the nozzles #1 to #180 of the color ink nozzle rows 211 for each color and when carrying out ejection testing of the nozzles #1 to #180 of the clear ink nozzle row 212. More detailed description of these test patterns is given later.

After forming the predetermined test pattern in this way, next, a check is carried out based on the test pattern that has been formed (S104). This check is carried out using the reflective optical sensor 300 that is mounted on the carriage 41 of the inkjet printer 1. The reflective optical sensor 300 carries out detection of the test pattern and, based on the detection result, it is investigated (S106) whether or not there is an ejection failure in the nozzles #1 to #180 of the color ink nozzle rows 211 of any of the colors or the nozzles #1 to #180 of the clear ink nozzle row 212. When it is determined that there is an ejection failure, nozzle cleaning is performed (S108). Detailed description of nozzle cleaning is given later. On the other hand, if it is determined that there is no ejection failure, then the process is ended.

=== Color Ink Test Pattern ===

Figure 12:
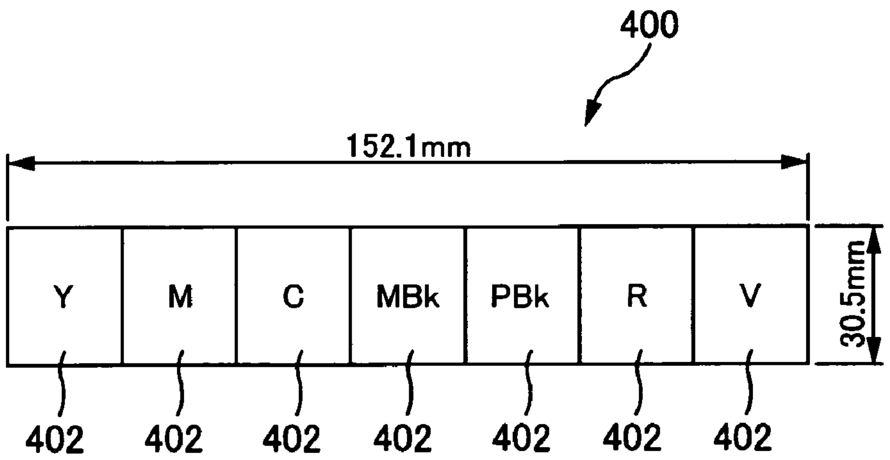
FIG. 12 is a diagram showing one example of a color-ink test pattern.

FIG. 12 shows one embodiment of a color-ink ejection-test pattern 400 (corresponding to the first test pattern in the present invention) for the various colors. As shown in FIG. 12, the test pattern 400 is constituted by rectangular patterns 402 formed for each of the color inks, which in the present embodiment are yellow (Y), magenta (M), cyan (C), matte black (MBk), photo black (PBk), red (R), and violet (V). In the present embodiment, the color block-shaped patterns 402 are arranged lined up in a row along the movement direction of the carriage 41. In the pattern 402 for each color, block-shaped patterns are formed corresponding to each of the ink nozzles #1 to #180 for each color.

Figure 13:
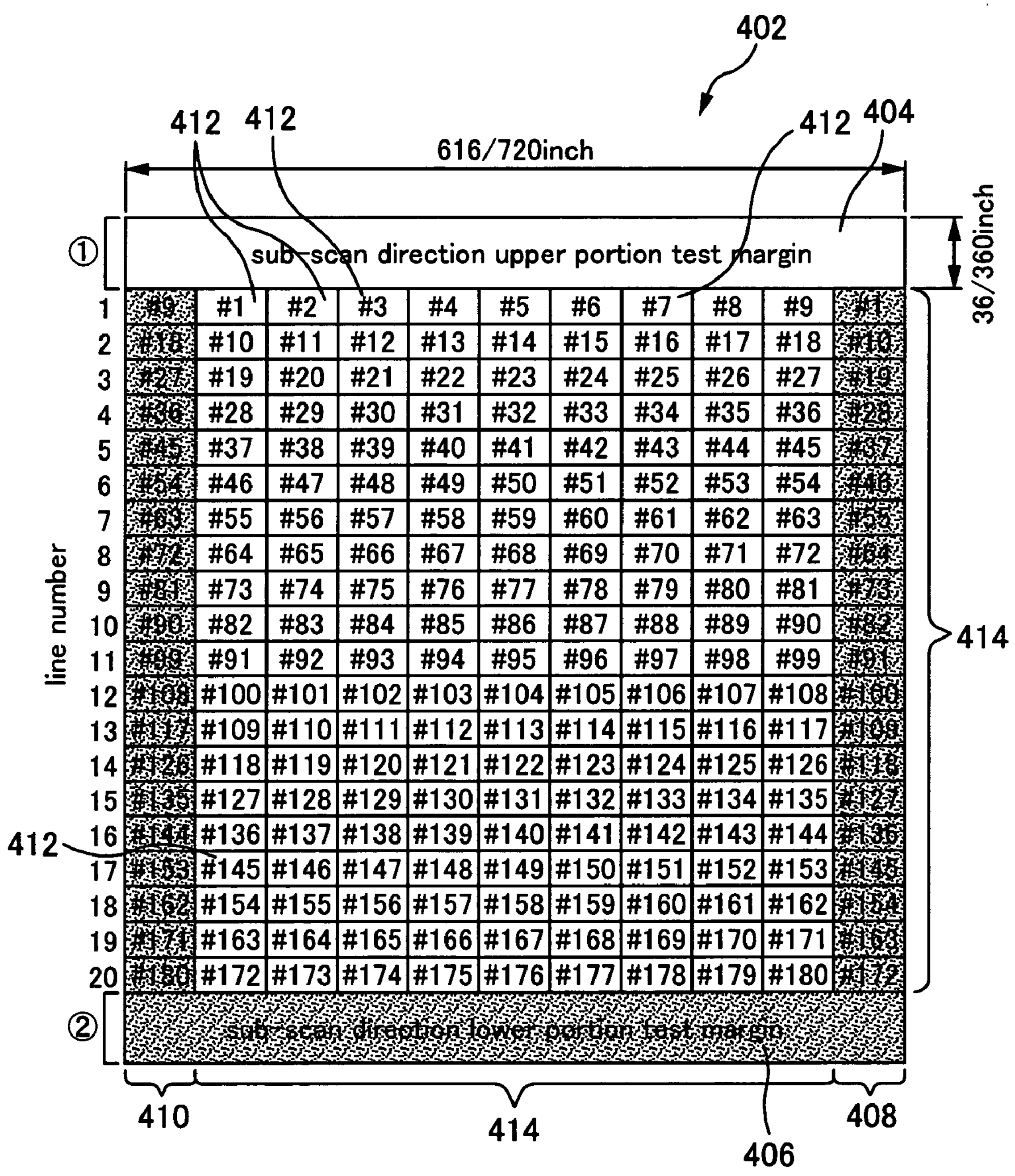
FIG. 13 is a detailed diagram of the test pattern of a given color.

FIG. 13 shows an enlarged and detailed view of the pattern 402 of a given color. As shown in FIG. 13, in the respective upper, lower, left, and right side portions of the pattern 402 are provided an upper portion test margin 404, a lower portion test margin 406, a right portion test margin 408, and a left portion test margin 410, and a test pattern group 414 for the individual nozzles constituted by a plurality of block-shaped test patterns 412 is formed so as to be enclosed within the test margins 404, 406, 408, and 410. The block-shaped test patterns 412 are formed corresponding respectively to the nozzles #1 to #180 that eject color ink of the various colors. That is, a single block-shaped pattern 412 is allotted for a single nozzle that ejects a color ink of a given color. Each block-shaped pattern 412 is formed by ejecting color ink only from the nozzle that corresponds to that pattern. In the present embodiment, the block-shaped test patterns 412 are formed in 20 lines in the vertical direction of the paper face (the carrying direction of the medium S) and in 9 rows in the horizontal direction of the paper face (the movement direction of the carriage 41).

It should be noted that the upper portion test margin 404 is formed by the nozzles #1 to #8 and #10 to #17, and the lower portion test margin 406 is formed by the nozzles #163 to #170 and #172 to #179. The right portion test margin 408, 410 and the left portion test margin are formed respectively by nozzles having the nozzle numbers shown in the drawing.

The block-shaped patterns 402 of each color are formed at high resolution. This is so that each of the patterns 412 corresponding to the respective nozzles #1 to #180 of the relevant pattern 402 can be easily detected by the reflective optical sensor 300. That is, when the relevant pattern 412 is formed at high resolution, each pattern 412 can be formed such that the darkness of the respective colors becomes darker, and in this way, it is possible to make larger the difference in darkness between empty-white areas in which no color ink has been ejected, that is, areas in which a pattern 412 corresponding to a nozzle has not been formed, and areas in which a pattern 412 corresponding to a nozzle has been formed. Accordingly, it is possible for the reflective sensor 300 to easily detect whether or not color ink has been ejected. This makes is possible to reliably check whether or not there is an ejection failure in any of the nozzles #1 to #180 of a color ink nozzle row 211 of the various colors.

It should be noted that "resolution" refers to the degree of fineness of the printing, which is expressed, for example, by the number of dots or the like formed per unit length. The resolution of the pattern 402 can be expressed here as 720 dpi (horizontal)×360 dpi (vertical), for example. It should be noted that the resolution of the ejection-test patterns of color inks in the present invention is not limited to the above-noted resolution.

=== Clear Ink Test Pattern ===

<Test Pattern>

Figure 14:
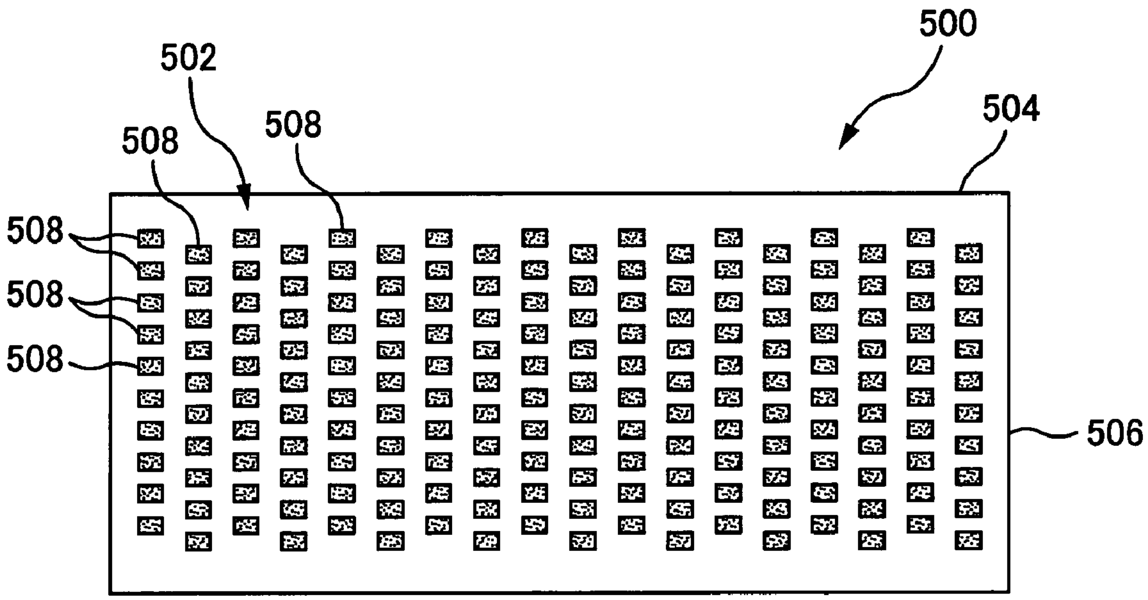
FIG. 14 is a diagram showing an example of a clear-ink test pattern.
Figure 15:
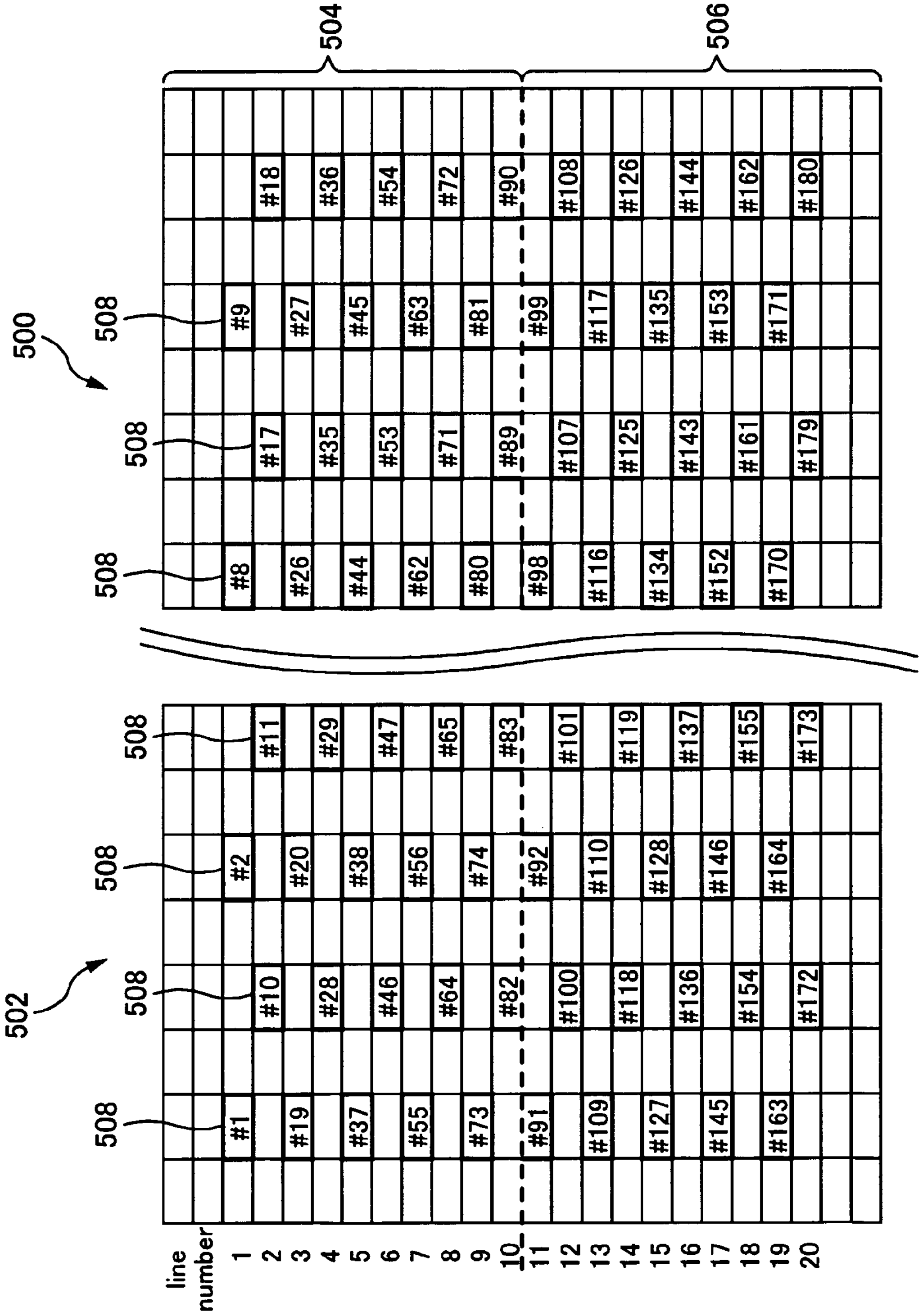
FIG. 15 is an enlarged, detailed diagram of the clear-ink test pattern.
Figure 16:
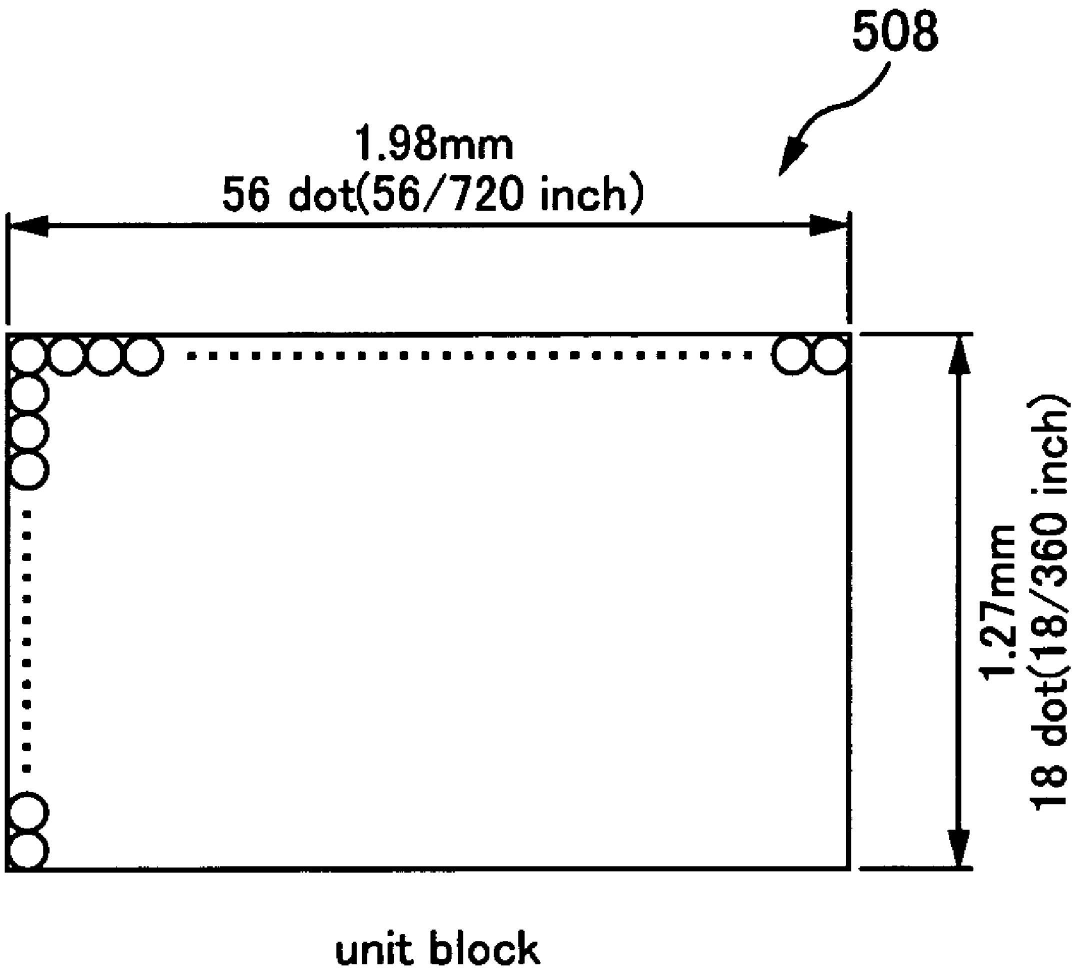
FIG. 16 is a detailed diagram of a block-shaped pattern.

FIG. 14 shows one embodiment of a clear-ink test pattern 500 (which corresponds to the second test pattern in the present invention). Furthermore, FIG. 15 shows an enlarged and detailed view of the clear-ink test pattern 500. FIG. 16 is a detailed view of one block-shaped pattern 508 formed in the clear-ink test pattern 500.

As shown in FIG. 14,the test pattern 500 is made of a clear ink pattern 502 formed by the ejection of clear ink, and two color ink patterns 504 and 506 formed by the ejection of color ink. The clear ink pattern 502 is constituted by a multitude of block-shaped patterns 508. As shown in FIG. 15, the block-shaped patterns 508 are respectively formed such that they correspond to one of the nozzles #1 to #180 that eject clear ink. That is, a single block-shaped pattern 508 is formed for a single nozzle that ejects clear ink. Each block-shaped pattern 508 is formed by the adherence of only clear ink ejected from the corresponding nozzle. As shown in FIG. 16, a single block-shaped pattern 508 is formed in a rectangular shape with dimensions of 1.98 mm horizontally (56 dots: *frax*;56;720 *inch*) and 1.27 mm vertically (18 dots: *frax*;18;360 *inch*). I*n* the present *embodiment*, the *block-shaped* patterns 508 are formed in 10 lines in the vertical direction of the paper face (the carrying direction of the medium S) and in 18 rows in the horizontal direction of the paper face (the movement direction of the carriage 41) with a spacing provided between one another.

On the other hand, the color ink patterns 504 and 506 are formed overlapping the clear ink pattern 502. In the present embodiment, the color ink patterns 504 and 506 are structured as two patterns, an upper portion pattern 504 and a lower portion pattern 506, and are formed in a rectangular shape such that the entire clear ink pattern 502 is covered as shown in the drawing. Cyan (C) is used as the color ink in the present embodiment. Alternatively, except for yellow (Y), which is the lightest color, other color inks such as magenta (M), matte black (MBk), photo black (PBk), red (R), and violet (V) may be used as the color ink that forms the color ink patterns 504 and 506 in the present embodiment.

It should be noted that, since the printer 1 is provided with color inks of the colors yellow (Y), magenta (M), cyan (C), matte black (MBk), photo black (PBk), red (R), and violet (V) as color inks to be used in printing in the present embodiment, it is possible to use color inks of colors other than the lightest color, yellow (Y), to form the color ink patterns 504 and 506, but when color inks of another combination are loaded in the printer 1, the color ink to be used in forming the color ink patterns 504 and 506 should be selected as appropriate according to the individual combination. In other words, if the printer 1 is provided with, for example, cyan (C), magenta (M), black (Bk), light cyan (LC), light magenta (LM), and dark yellow (DY) as a combination of color inks, then light cyan (LC) and light magenta (LM) should be picked out as color inks not to be used in forming the color ink patterns 504 and 506, and a selection should be made as appropriate from the other color inks aside from light cyan and light magenta, namely, from cyan (C), magenta (M), black (Bk), and dark yellow (DY).

<Reason for Forming Color Ink Patterns>

The color ink patterns 504 and 506 are formed overlapping the clear ink pattern 502 in this way for the following reason. When the clear ink pattern 502 and the color ink patterns 504 and 506 are formed overlapping, the regions in which patterns 502, 504 and 506 of both inks overlap one another have a different color from that in regions in which only color ink is adhering, as shown in FIGS. 14 and 15. The reason to this is thought to be that, due to the clear ink and the color ink being applied to the same region, the two inks blur. In other words, this is because the color ink spreads on the medium S by blurring with the clear ink. When the color ink is formed as dots on the medium S, the underlying color, that is, the white color of the medium S, is evident on the surface through the spacing between the dots and makes the color appear lighter. On the other hand, when the color ink blurs with the clear ink and spreads on the medium S, the surface of the medium S becomes covered by the color ink, and therefore the underlying color, that is, the white color of the medium S does not appear on the surface and the color does not lighten that much.

In particular, by first ejecting the clear ink onto the medium S and then afterward ejecting the color ink onto the region in which the clear ink has been ejected first, it is possible to make the blurring of the color ink and clear ink show up even more. This is thought to be because that, by first ejecting the clear ink onto the medium S, the surface of the medium S can be put into a state in which the surface of the medium S is impregnated with clear ink, and the color ink that is subsequently ejected onto this immediately blurs with the clear ink, thus widely spreading the color ink on the medium S. In this way, the color difference can be made very distinct.

Of course, it is also possible to cause the color ink and the clear ink to blur by first ejecting the color ink and then ejecting the clear ink. However, since most of the color ink that is ejected first gets fixed in such ways as permeating into the medium S, there is little blurring with the clear ink when clear ink is subsequently ejected onto the medium, and therefore, the color difference may not stand out that much. In particular, glossy paper etc., unlike plain paper, is provided with a fixing layer for fixing ink on the surface of the paper. Therefore, color ink fixes on the medium S when the color ink is ejected first, and thus there is little blurring when clear ink is subsequently ejected onto the paper. When giving consideration to the assumption that a user is going to carry out the testing, it is preferable to employ a method capable of generally forming a test pattern on various media S such as plain paper and glossy paper, that is, a technique in which clear ink is ejected first and color ink is ejected afterwards, because it is uncertain whether plain paper or glossy paper will be used as the medium S for forming the test pattern.

<Resolution of the Color Ink Pattern>

It is preferable that the resolution of the color ink patterns 504 and 506 formed in this example are set as low as possible. That is, since the color ink patterns 504 and 506 are formed in order to carry out clear ink ejection testing by being overlapped with the clear ink pattern 502 as described above, it is preferable that the darkness of the color in regions in which there is no overlap with the clear ink pattern 502 is greatly different compared to the regions in which there is an overlap with the clear ink pattern 502. Accordingly, when considering the contrast between regions in which there is an overlap with the clear ink pattern 502 and regions in which there is no overlap, it is preferable that the color of the areas in which there is no overlap with the clear ink pattern 502 is, as much as possible, lighter compared to the regions in which there is an overlap with the clear ink pattern 502. That is to say, it is preferable that the color ink patterns 504 and 506 are formed with a lower resolution in contrast to the color-ink test pattern 400 shown in FIGS. 12 and 13.

In the present embodiment, the color ink patterns 504 and 506 are formed with a resolution of 180 dpi (horizontal)× 360 dpi (vertical). It should be noted that, here, the resolution of the vertical direction is not changed in contrast to the color-ink test patterns, and only the resolution of the horizontal direction is set smaller. It should be noted that the resolution of the color ink patterns 504 and 506 in the present invention is not limited to this resolution.

<Procedure for Forming Test Patterns>

Figure 17A:
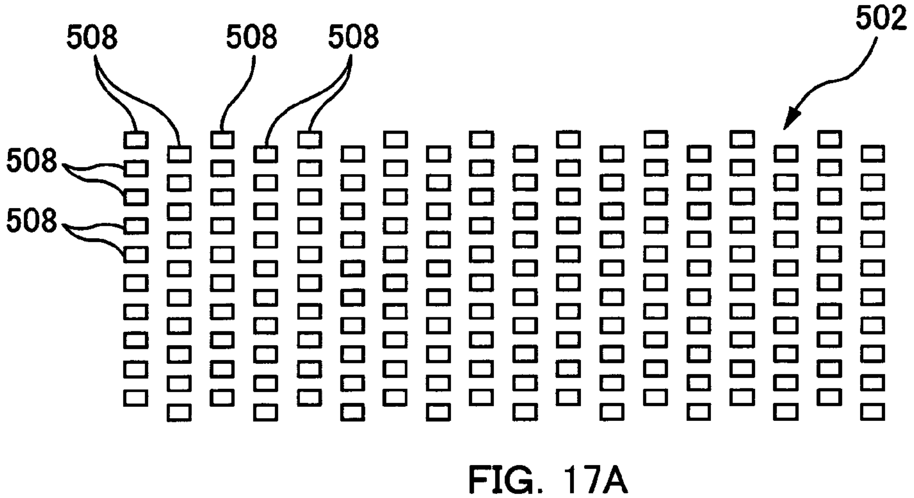
FIG. 17A is a first explanatory diagram of a procedure for forming a clear-ink test pattern.
Figure 17B:
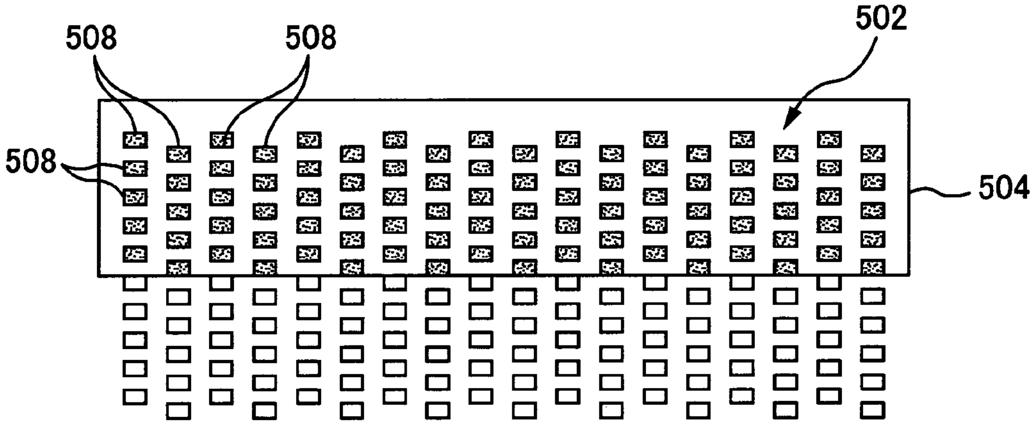
FIG. 17B is a second explanatory diagram of a procedure for forming a clear-ink test pattern.
Figure 17C:
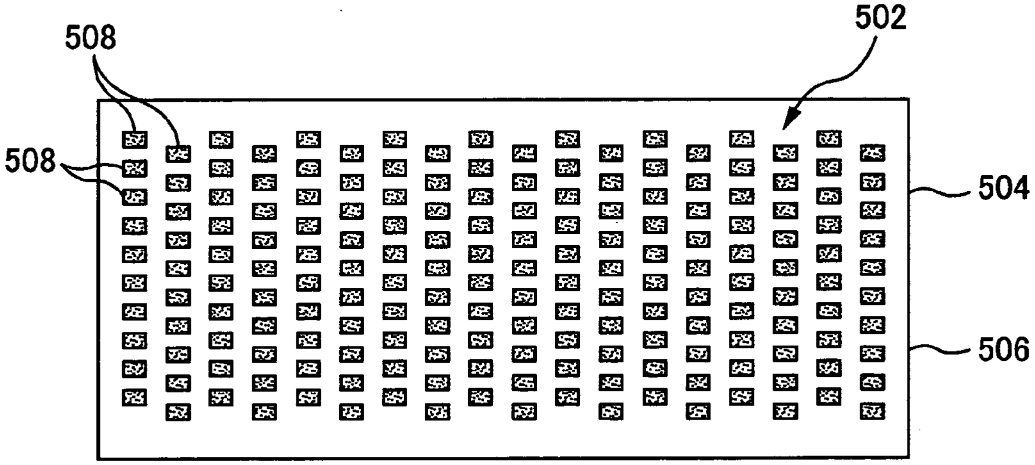
FIG. 17C is a third explanatory diagram of a procedure for forming a clear-ink test pattern.

The following is a description of a method for forming the test patterns. FIGS. 17A to 17C show an example of a procedure for forming a clear-ink test pattern. In forming the clear-ink test pattern 500, first, as described above, clear ink is ejected onto the medium S as shown in FIG. 17A to form a clear ink pattern 502 made of block-shaped patterns 508 for individual nozzles. In the present embodiment, each of the block-shaped patterns 508 is formed using the above-described "large dots." The operation in which the above-described block-shaped patterns 508 are formed with this resolution is performed a plurality of times. That is, clear ink is ejected onto the same region on the medium S a plurality of times, for example, four times.

Next, color ink patterns 504 and 506 are formed so as to cover the clear ink pattern 502 that has been formed by ejecting clear ink. In this example, the ejection of color ink is divided into two stages. First, as shown in FIG. 17B, the color-ink upper portion pattern 504 is formed to cover the upper half of the clear ink pattern 502. Then, as shown in FIG. 17C, the color-ink lower portion pattern 506 is ejected to cover the lower half of the clear ink pattern 502, thus completing the pattern. It should be noted that the forming of the color-ink upper portion pattern 504 is carried out using the nozzles #1 to #108 that eject that color ink, and the forming of the lower portion patter 506 is carried out using the nozzles #73 to #180 that eject that color ink. In the present embodiment, the upper portion pattern 504 and the lower portion pattern 506 are formed with aforementioned "large dots."

In this way, forming the color ink patterns 504 and 506 to cover the entire clear ink pattern 502 formed with clear ink completes the formation of the clear-ink test pattern 500.

=32 = Method for Checking Test Patterns ===

The following is a description of a method for checking the thus-formed test patterns 400 and 500. Checking of the test pattern is carried out using the reflective optical sensor 300 provided on the carriage 41. The reflective optical sensor 300 is arranged above the test pattern and checks the block-shaped patterns formed in the test pattern line by line by moving relative to the medium S with the movement of the carriage 41. At this time, light is emitted toward the medium S from the light-emitting section 300A of the reflective optical sensor 300, and the emitted light is reflected by the medium S and received by the light-receiving section 300B. The reflective optical sensor 300 outputs the amount of light received by the light-receiving section 300B to the system controller 126.

Based on the result of light received from the reflective optical sensor 300, the system controller 126 checks the nozzles individually for whether or not there is an ejection failure. Specifically, the system controller 126 compares the amount of light received by the light-receiving section 300B of the reflective optical sensor 300 with a predetermined threshold value that is stored in advance in the main memory, and determines whether or not there is an ejection failure. When one line of the checking is finished, the medium S is carried by the carrying section and checking with respect to the next line is carried out. In this way, whether or not there is an ejection failure is checked successively using the test pattern. It should be noted that the system controller 126 corresponds to the checking means in the present invention.

=== Action Taken When Ejection Failure is Discovered ===

When the result of the above-described ejection testing is that nozzles in which there is an ejection failure such as clogging are discovered by the sensor 300, a cleaning operation is performed to solve the clogging or other ejection failure. The cleaning operation that may be carried out in this example is as described below.

<Nozzle Suction>

This is a method carried out using the cleaning device described in FIG. 2. Specifically, ink is forcefully sucked out from the nozzle by the above-described pump device 31 to eliminate the clogging or other ejection failure.

<Flushing>

Flushing is a method by which ink is forcefully ejected from the nozzles. Specifically, the piezo elements of the nozzles are driven to forcefully discharge ink from the nozzles. This eliminates the clogging or other ejection failure.

With the foregoing embodiment, by forming color ink patterns overlapping the clear ink pattern when forming a test pattern to be used in clear-ink ejection testing, it is possible to make the color in the areas in which the color ink pattern and the clear ink pattern overlap become different from the color in the areas in which there is only color ink patterns, and this makes it possible for the sensor 300 or the like to easily confirm whether or not the clear ink is being ejected properly. Moreover, by forming the color ink patterns with a lower resolution than the test pattern used in color-ink ejection testing, the color difference can be made to stand out more, and thus it becomes even easier to perform clear-ink ejection verification.

It should be noted that, in the above-described embodiment, the color-ink test patterns and the clear-ink test pattern were described individually, but both of these test patterns may be formed on the same medium S. By forming both test patterns on the same medium S, it is possible to conserve the medium S.

=== Configuration of the Printing System etc. ===

The following is a description of an example of a printing system provided with an inkjet printer, which serves as a printing apparatus, as an example of a printing system according to the present invention.

Figure 18:
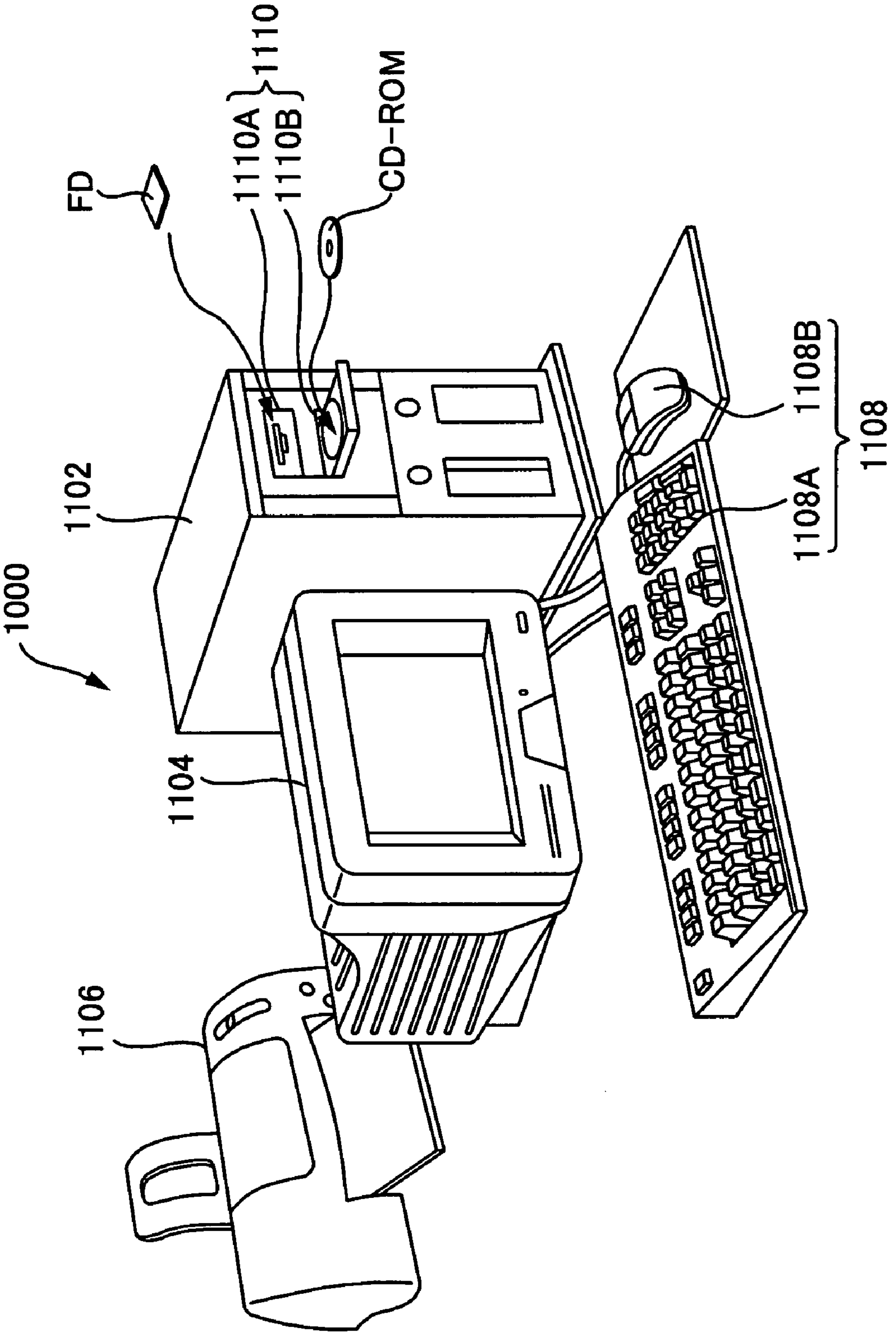
FIG. 18 is a diagram showing the external configuration of a printing system.

FIG. 18 is an explanatory diagram showing the external configuration of the printing system. A printing system 1000 is provided with a main computer unit 1102, a display device 1104, a printer 1106, an input device 1108, and a reading device 1110. In this embodiment, the main computer unit 1102 is accommodated within a mini-tower type housing; however, this is not a limitation. A CRT (cathode ray tube), a plasma display, or a liquid crystal display device, for example, is generally used as the display device 1104, but this is not a limitation. The printer 1106 is the printer described above. In this embodiment, the input device 1108 is a keyboard 1108A and a mouse 1108B, but it is not limited to these. In this embodiment, a flexible disk drive device 1110A and a CD-ROM drive device 1110B are used as the reading device 1110, but the reading device 1110 is not limited to these, and it may also be a MO (magnet optical) disk drive device or a DVD (digital versatile disk), for example.

Figure 19:
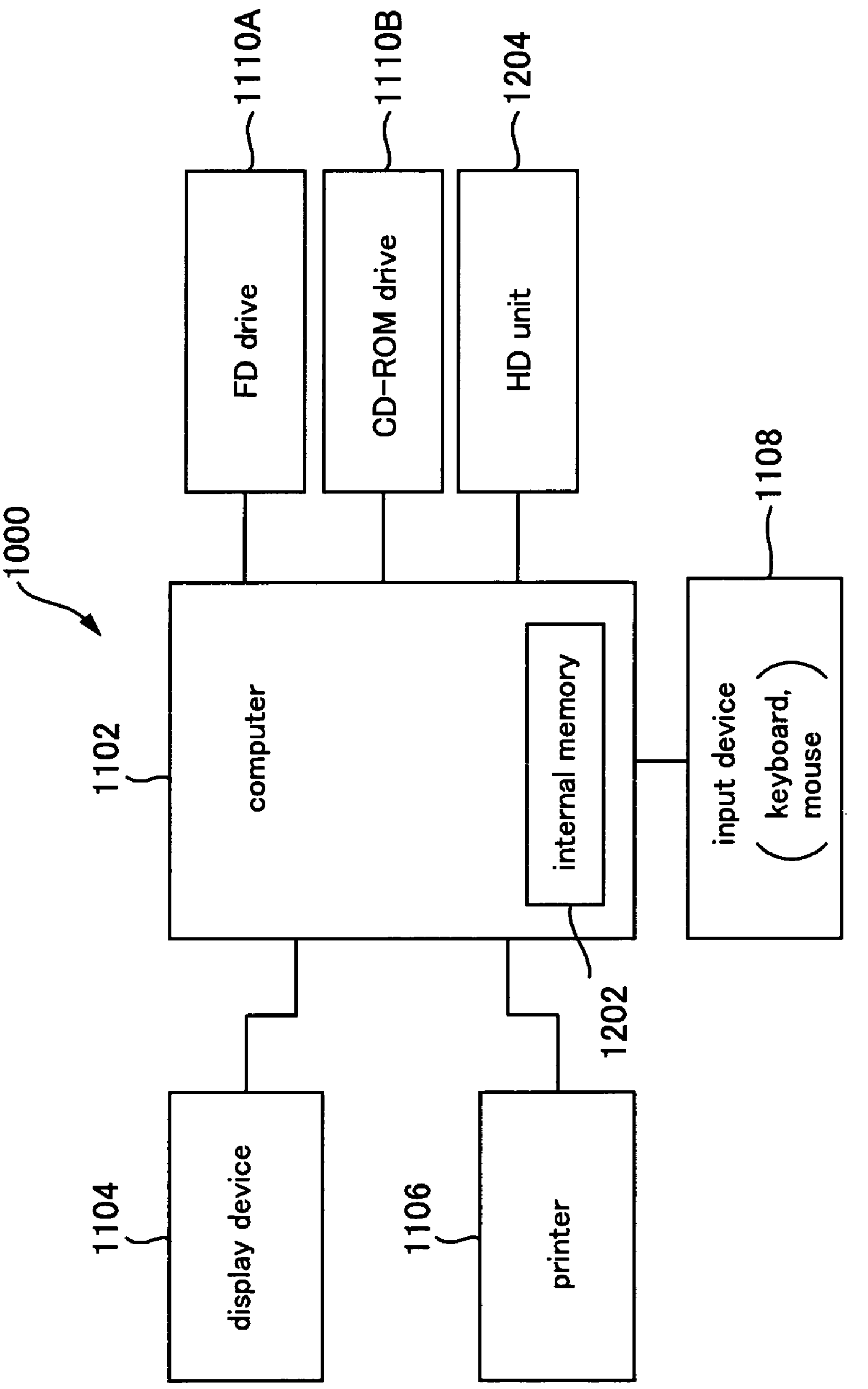
FIG. 19 is a block diagram showing the configuration of the printing system.

FIG. 19 is a block diagram showing the configuration of the printing system shown in FIG. 18. An internal memory 1202 such as a RAM within the housing accommodating the main computer unit 1102 and, also, an external memory such as a hard disk drive unit 1204 are provided.

A computer program for controlling the operation of the above printer can be downloaded onto the computer 1000, for example, connected to the printer 1106 via a communications line such as the Internet, and it can also be stored on a computer-readable storage medium and distributed, for example. Various types of storage media can be used as this storage medium, including flexible disks FDs, CD-ROMs, DVD-ROMs, magneto optical disks MOs, hard disks, and memories. It should be noted that information stored on such storage media can be read by various types of reading devices 1110.

In the above description, an example was described in which the computer system is constituted by connecting the printer 1106 to the main computer unit 1102, the display device 1104, the input device 1108, and the reading device 1110. However, this is not a limitation. For example, the computer system can be made of the main computer unit 1102 and the printer 1106, or the computer system does not have to be provided with one of the display device 1104, the input device 1108, and the reading device 1110. It is also possible for the printer 1106, for example, to have some of the functions or mechanisms of the main computer unit 1102, the display device 1104, the input device 1108, and the reading device 1110. As an example, the printer 1106 may be configured so as to have an image processing section for carrying out image processing, a display section for carrying out various types of displays, and a recording media attachment/detachment section to and from which recording media storing image data captured by a digital camera or the like are inserted and taken out.

In the embodiment described above, it is also possible for the computer program for controlling the printer to be incorporated in the memories 127 and 129. Also, the control unit may execute the computer program stored in the memories 127 and 129 so as to achieve the operations of the printer in the embodiment described above.

As an overall system, the printing system that is thus achieved becomes superior to conventional systems.

Other Embodiments

In the foregoing, a printing apparatus such as a printer according to the invention was described based on an embodiment thereof. However, the foregoing embodiment is for the purpose of elucidating the present invention and is not to be interpreted as limiting the present invention. The invention can of course be altered and improved without departing from the gist thereof and includes its equivalents.

In particular, the embodiments mentioned below are also included in the printing apparatus according to the present invention.

Furthermore, in the present embodiment, all or part of the configuration realized by hardware may be replaced by software. Conversely, parts of the configuration realized by software may be replaced by hardware.

Furthermore, in addition to printing paper, the medium to be printed may be cloth or film, for example.

Furthermore, part of the processes carried out on the printing apparatus side may be carried out on the host side, and it is also possible to interpose a special-purpose processing device between the printing apparatus and the host such that some of the processes are carried out by the processing device.

<Regarding the Printing Apparatus>

The printing apparatus according to the present invention is not limited to the above-described inkjet printer, and may be a printing apparatus that carries out printing using a different method of ink ejection, such as a BubbleJet (registered trademark) printer.

<Regarding the Color Ink Ejecting Section>

In the foregoing embodiment, a nozzle row having a multitude of nozzles was given as an example of the color ink ejecting section, but the present invention is not limited to such a nozzle row, and the color ink ejecting section may be in any form as long as it is a section that ejects color ink.

<Regarding the Clear Ink Ejecting Section>

In the foregoing embodiment, a nozzle row having a multitude of nozzles was given as an example of the clear ink ejecting section, but the present invention is not limited to such a nozzle row, and the clear ink ejecting section may be in any form as long as it is a section that ejects clear ink.

<Regarding the Medium S>

Regarding the medium S, it is possible to use plain paper, matte paper, cut paper, glossy paper, roll paper, print paper, photo paper, and roll-type photo paper or the like as the above-described print paper, and in addition to these, the medium may be a film material such as OHP film and glossy film, a cloth material, or a metal plate material or the like. In other words, it may be any kind of media as long as it is capable of being an object for the ejection of a liquid.

<Regarding the Sensor>

In the foregoing embodiment, the reflective optical sensor 300 was provided as the sensor for detecting the test patterns, but the present invention is not limited to this, and may be provided with an optical sensor of a type other than the reflective type or a sensor of any other system as long as it is capable of detecting the test patterns.

What is claimed is:

1. A method for testing ejection, comprising the steps of:

forming a first test pattern by ejecting a color ink onto a medium from a color ink ejecting section for ejecting color ink, said first test pattern being used for testing ejection of said color ink ejecting section; and forming a second test pattern by ejecting a clear ink from a clear ink ejecting section for ejecting clear ink to form a clear ink pattern on the medium, and ejecting a color ink from said color ink ejecting section to form a color ink pattern that overlaps said clear ink pattern, said second test pattern being used for testing ejection of said clear ink ejecting section;

wherein a resolution of said color ink pattern is different from a resolution of said first test pattern.

2. A method for testing ejection according to claim 1, wherein the resolution of said color ink pattern is lower than the resolution of said first test pattern.

3. A method for testing ejection according to claim 1, wherein said color ink ejecting section is capable of ejecting color inks of a plurality of colors, and a color ink of one color, from among said color inks of the plurality of colors, is used in forming said color ink pattern.

4. A method for testing ejection according to claim 3, wherein the color of said color ink ejected onto a region in which said clear ink is to be adhering is a color ink other than a color ink of the lightest color among said color inks.

5. A method for testing ejection according to claim 1, wherein said color ink and said clear ink blur in a region in which said clear ink pattern and said color ink pattern overlap.

6. A method for testing ejection according to claim 1, wherein a darkness of a color in a region in which said clear ink pattern and said color ink pattern overlap is different from a darkness of a color in a region in which only said color ink pattern is formed with no overlap with said clear ink pattern.

7. A method for testing ejection according to claim 6, wherein the darkness of the color in said region in which said clear ink pattern and said color ink pattern overlap is darker than the darkness of the color in said region in which only said color ink pattern is formed with no overlap with said clear ink pattern.

8. A method for testing ejection according to claim 1, wherein a plurality of nozzles for ejecting said clear ink are provided as said clear ink ejecting section, and said clear ink pattern has patterns each for separate ones of said nozzles.

9. A method for testing ejection according to claim 1, wherein said second test pattern is formed on the same medium as said first test pattern.

10. A method for testing ejection according to claim 1, wherein whether or not there is an ejection failure in said clear ink ejecting section or said color ink ejecting section is checked based on an output from a sensor that detects said first test pattern or said second test pattern.

11. A method for testing ejection according to claim 1, wherein said color ink ejecting section and said clear ink ejecting section are provided in a print head that is arranged to be movable relatively with respect to said medium.

12. A method for testing ejection according to claim 11, wherein said medium is carried in a direction that intersects with a movement direction of said print head.

13. A method for testing ejection, comprising the steps of:

forming a first test pattern by ejecting a color ink onto a medium from a color ink ejecting section for ejecting color ink, said first test pattern being used for testing ejection of said color ink ejecting section; and forming a second test pattern by ejecting a clear ink from a clear ink ejecting section for ejecting clear ink to form a clear ink pattern on the medium, and ejecting a color ink from said color ink ejecting section to form a color ink pattern that overlaps said clear ink pattern, said second test pattern being used for testing ejection of said clear ink ejecting section;

wherein the resolution of said color ink pattern is lower than the resolution of said first test pattern;

wherein said color ink ejecting section is capable of ejecting color inks of a plurality of colors, and a color ink of one color, from among said color inks of the plurality of colors, is used in forming said color ink pattern;

wherein the color of said color ink ejected onto a region in which said clear ink is to be adhering is a color ink other than a color ink of the lightest color among said color inks;

wherein said color ink and said clear ink blur in a region in which said clear ink pattern and said color ink pattern overlap;

wherein a darkness of a color in said region in which said clear ink pattern and said color ink pattern overlap is darker than a darkness of a color in a region in which only said color ink pattern is formed with no overlap with said clear ink pattern;

wherein a plurality of nozzles for ejecting said clear ink are provided as said clear ink ejecting section, and said clear ink pattern has patterns each for separate ones of said nozzles;

wherein whether or not there is an ejection failure in said clear ink ejecting section or said color ink ejecting section is checked based on an output from a sensor that detects said first test pattern or said second test pattern; and wherein said color ink ejecting section and said clear ink ejecting section are provided in a print head that is arranged to be movable relatively with respect to said medium.

14. A printing apparatus comprising:

a color ink ejecting section for ejecting a color ink;

a clear ink ejecting section for ejecting a clear ink; and a controller for controlling ink ejection from said color ink ejecting section and said clear ink ejecting section;

wherein said controller:

forms a first test pattern by causing the color ink to be ejected onto a medium from said color ink ejecting section for ejecting the color ink, said first test pattern being used for testing ejection of said color ink ejecting section; and forms a second test pattern by causing the clear ink to be ejected from said clear ink ejecting section for ejecting the clear ink to form a clear ink pattern on the medium, and by causing the color ink to be ejected from said color ink ejecting section to form a color ink pattern that overlaps said clear ink pattern, said second test pattern being used for testing ejection of said clear ink ejecting section; and wherein a resolution of said color ink pattern is different from a resolution of said first test pattern.

15. A method for forming an ejection-test pattern, comprising the steps of:

forming a first test pattern by ejecting a color ink onto a medium from a color ink ejecting section for ejecting color ink, said first test pattern being used for testing ejection of said color ink ejecting section; and forming a second test pattern by ejecting a clear ink from a clear ink ejecting section for ejecting clear ink to form a clear ink pattern on the medium, and ejecting a color ink from said color ink ejecting section to form a color ink pattern that overlaps said clear ink pattern, said second test pattern being used for testing ejection of said clear ink ejecting section;

wherein a resolution of said color ink pattern is different from a resolution of said first test pattern.

16. An ejection-test pattern comprising:

a first test pattern that is formed by ejecting a color ink onto a medium from a color ink ejecting section for ejecting color ink, said first test pattern being used for testing ejection of said color ink ejecting section; and a second test pattern that includes a clear ink pattern formed by ejecting a clear ink onto the medium from a clear ink ejecting section for ejecting clear ink, and a color ink pattern formed by ejecting a color ink onto the medium from said color ink ejecting section in such a manner as to overlap said clear ink pattern, said second test pattern being used for testing ejection of said clear ink ejecting section;

wherein a resolution of said color ink pattern is different from a resolution of said first test pattern.

17. A computer-readable medium comprising:

a code for causing formation of a first test pattern by causing ejection of a color ink onto a medium from a color ink ejecting section for ejecting color ink, said first test pattern being used for testing ejection of said color ink ejecting section; and a code for causing formation of a second test pattern by causing ejection of a clear ink from a clear ink ejecting section for ejecting clear ink to form a clear ink pattern on the medium, and by causing ejection of a color ink from said color ink ejecting section to form a color ink pattern that overlaps said clear ink pattern, said second test pattern being used for testing ejection of said clear ink ejecting section;

wherein a resolution of said color ink pattern is different from a resolution of said first test pattern.

18. A printing system comprising:

a computer; and a printing apparatus that is connectable to said computer and that includes:

a color ink ejecting section for ejecting a color ink;

a clear ink ejecting section for ejecting a clear ink; and a controller for controlling ink ejection from said color ink ejecting section and said clear ink ejecting section;

wherein said controller:

forms a first test pattern by causing the color ink to be ejected onto a medium from said color ink ejecting section for ejecting the color ink, said first test pattern being used for testing ejection of said color ink ejecting section; and forms a second test pattern by causing the clear ink to be ejected from said clear ink ejecting section for ejecting the clear ink to form a clear ink pattern on the medium, and by causing the color ink to be ejected from said color ink ejecting section to form a color ink pattern that overlaps said clear ink pattern, said second test pattern being used for testing ejection of said clear ink ejecting section; and wherein a resolution of said color ink pattern is different from a resolution of said first test pattern.

* * * * *